United States Patent [19]
Seitz et al.

[11] Patent Number: 5,867,280
[45] Date of Patent: Feb. 2, 1999

[54] ENGRAVER WITH AUTOMATIC TOOL CHANGER

[75] Inventors: David R. Seitz, Vandalia; Kenneth F. Bornhorst, Jr., Centerville; Eric R. Auberry, Beavercreek; Eric Helser, Dayton; Jim Klinger, Huber Heights, all of Ohio

[73] Assignee: Ohio Electronic Engravers, Inc., Dayton, Ohio

[21] Appl. No.: 744,184

[22] Filed: Nov. 5, 1996

Related U.S. Application Data

[63] Continuation-in-part of Ser. No. 476,093, Jun. 7, 1995, which is a continuation of Ser. No. 125,938, Sep. 23, 1993, Pat. No. 5,440,398, which is a continuation-in-part of Ser. No. 38,679, Mar. 26, 1993, Pat. No. 5,438,422, which is a continuation-in-part of Ser. No. 22,127, Feb. 25, 1993, Pat. No. 5,424,845.

[51] Int. Cl.$^6$ .................................................. B41C 1/02
[52] U.S. Cl. ................................................................ 358/299
[58] Field of Search ................................................ 358/299

[56] References Cited

U.S. PATENT DOCUMENTS

| | | | |
|---|---|---|---|
| 5,424,845 | 6/1995 | Holowko et al. | 358/299 |
| 5,440,398 | 8/1995 | Holowko et al. | 358/299 |
| 5,475,914 | 12/1995 | Bornhorst, Jr. | 29/560 |

OTHER PUBLICATIONS

"Machining Vertical Centers, Machining Horizontal Centers/Cells, Turning Centers", Cincinnati Milacron Marketing Company, 4701 Marburg Avenue, Cincinnati, Ohio 45209, Publication No. A–554 (1996).
"Avenger—CNC Turning Centers", Cincinnati Milacron Marketing Company, 4701 Marburg Avenue, Cincinnati, Ohio 45209, Publication No. L–644–2 (1995).
"Flexible Maching Module", Makino, 7680 Innovation Way, Mason, Ohio 45040–8003 (1996).
"Productivity Solutions. CNC Turning Centers", Emco Maier Corporation, 2757 Scioto Parkway, Columbus, Ohio 43221–4664 (undated brochure).
"Vertical Maching Centers", Haas Automation, Inc., 9601 Lurline Avenue, Chatsworth, California 91311 (1996–1997).
"Horizontal Maching Centers", Haas Automation, Inc. 9601 Lurline Avenue, Chatsworth, California 91311 (1996).

*Primary Examiner*—Eric Frahm
*Attorney, Agent, or Firm*—Jacox, Meckstroth & Jenkins

[57] ABSTRACT

An engraver including an automatic tool changer and verification system for changing engraving tools on engraving heads. The engraver includes a turret having a plurality of workholders for holding a plurality of replacement tools. Some of the workholders are empty for replacing a worn tool from an engraving head on the engraver. When it is desired to change a tool on the engraving head, an empty tool holder is indexed to a tool changing position opposite the engraving head whereupon the worn tool is transferred from the engraving head to the tool changer. Thereafter, the tool changer is indexed to a position where a replacement tool is situated in opposed relationship with the engraving head. The tool changer includes a pneumatic system for causing the worn tools and replacement tools to be transferred between the engraving head and the tool changer. The engraver also utilizes a tool verification routine for verifying that a tool on the engraving head is the correct tool and/or is not defective. Moreover, the engraver may be equipped with an engraving head turret having multiple engraving heads for indexing into engraving relationship with a cylinder to be engraved. The multiple-engraving head turret facilitates, for example, reducing the number of required tool changes.

25 Claims, 17 Drawing Sheets

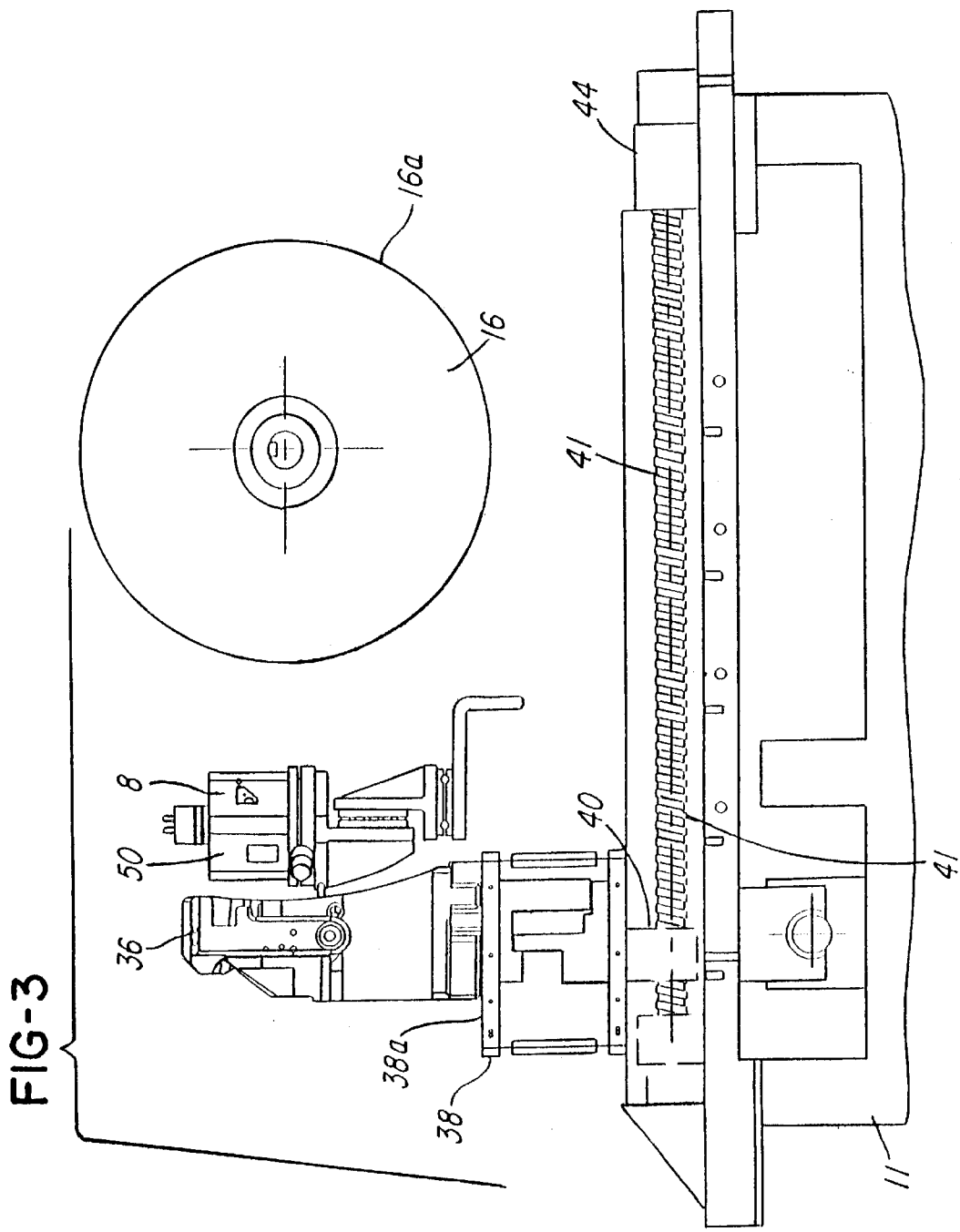

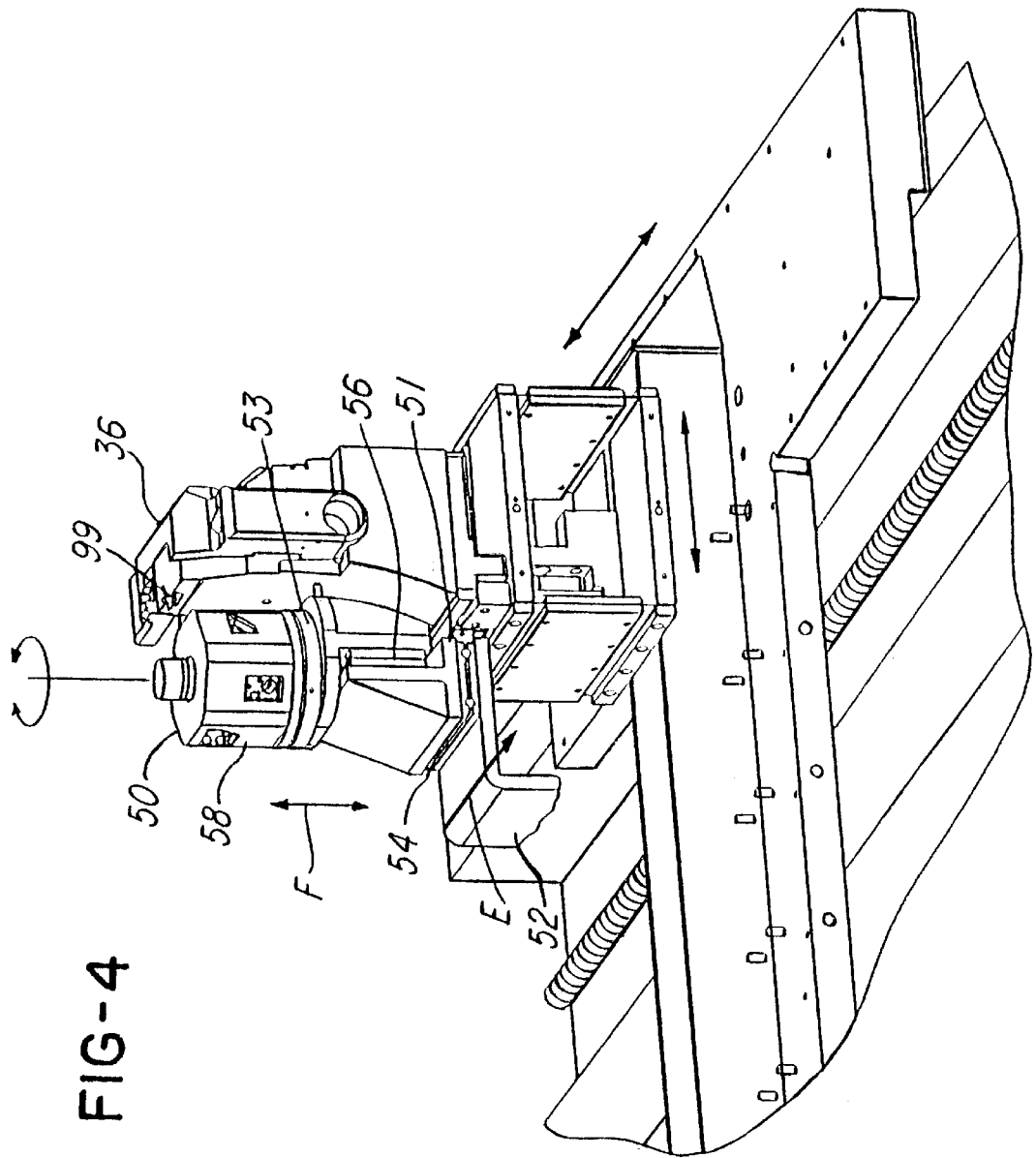

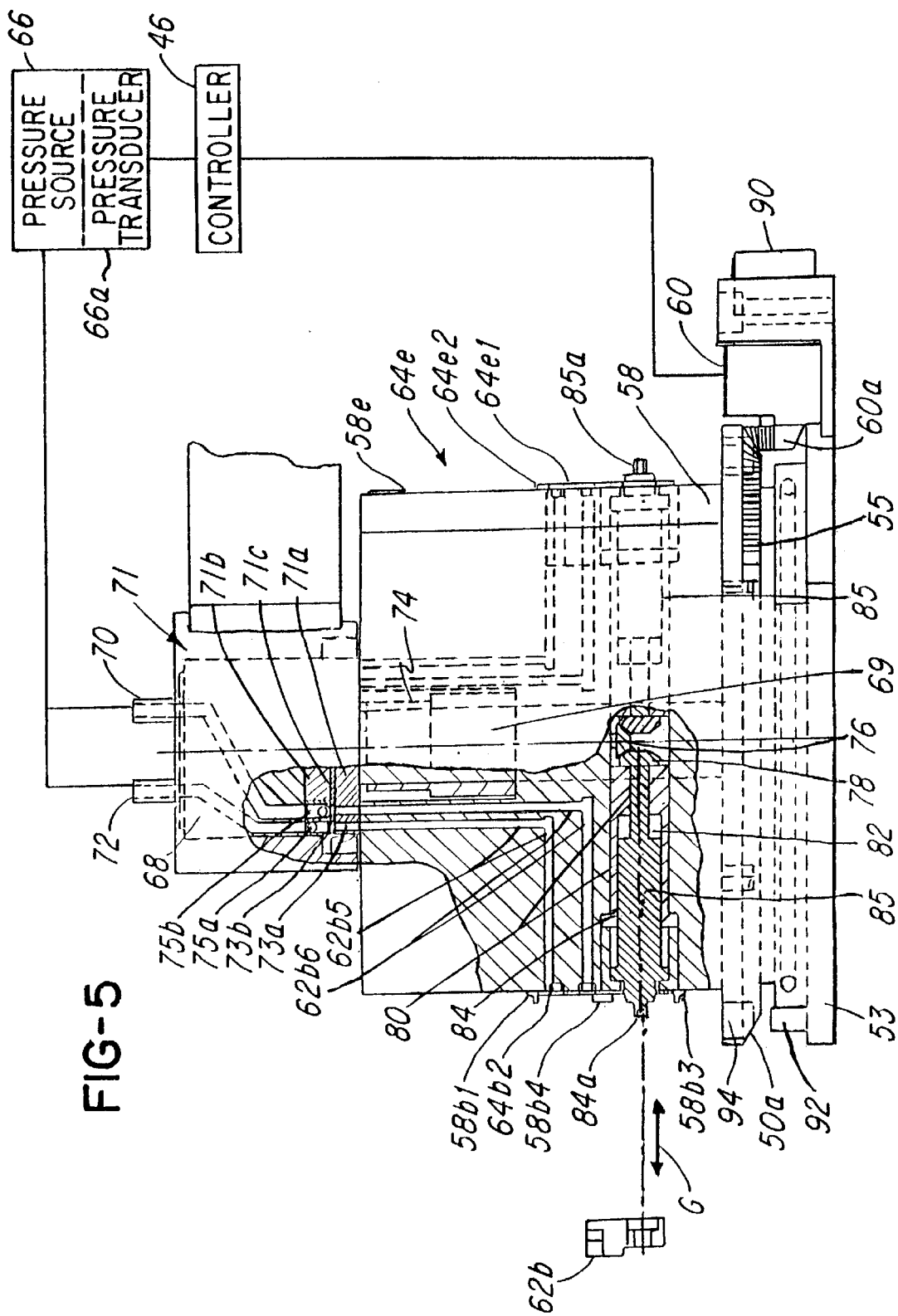

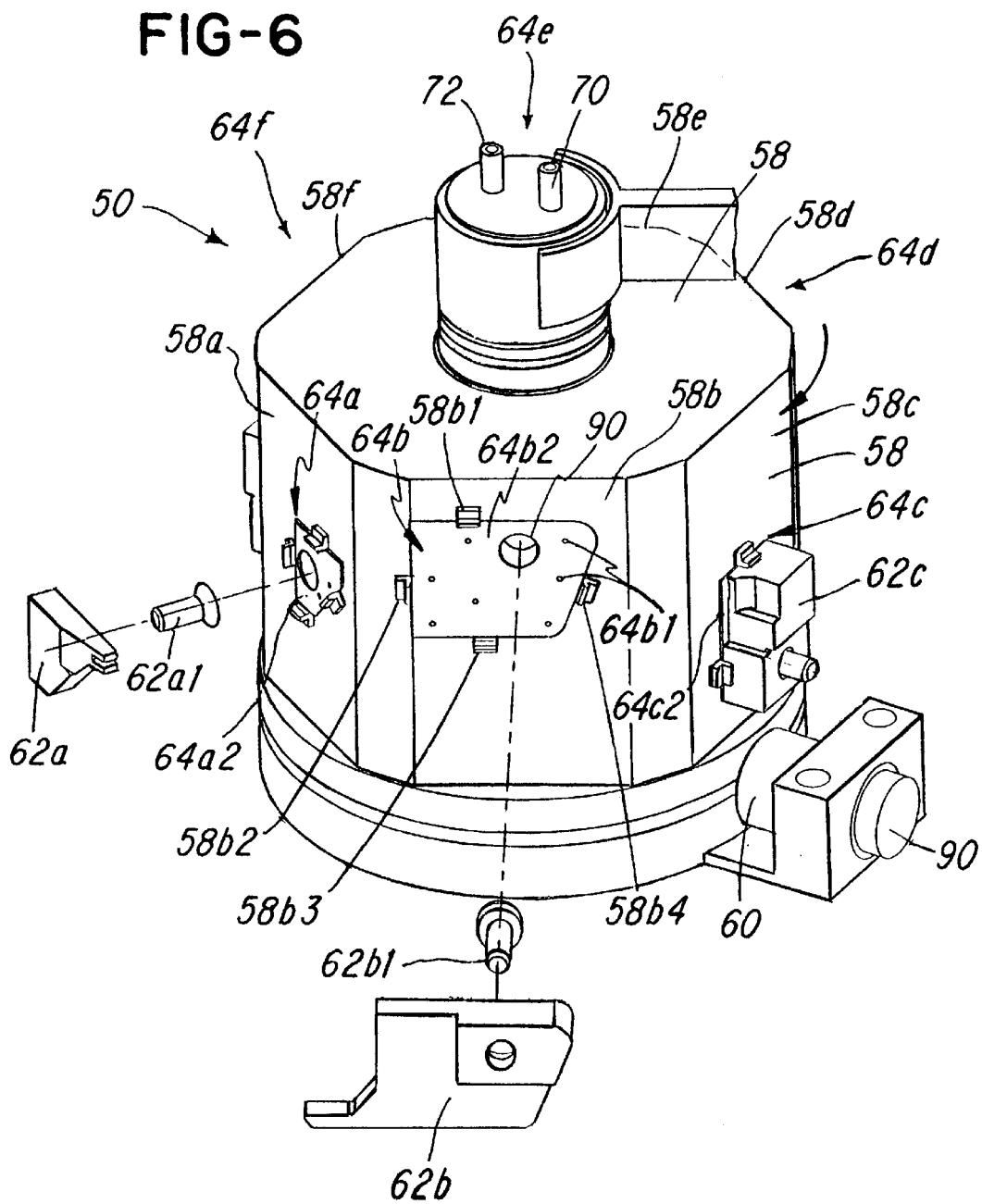

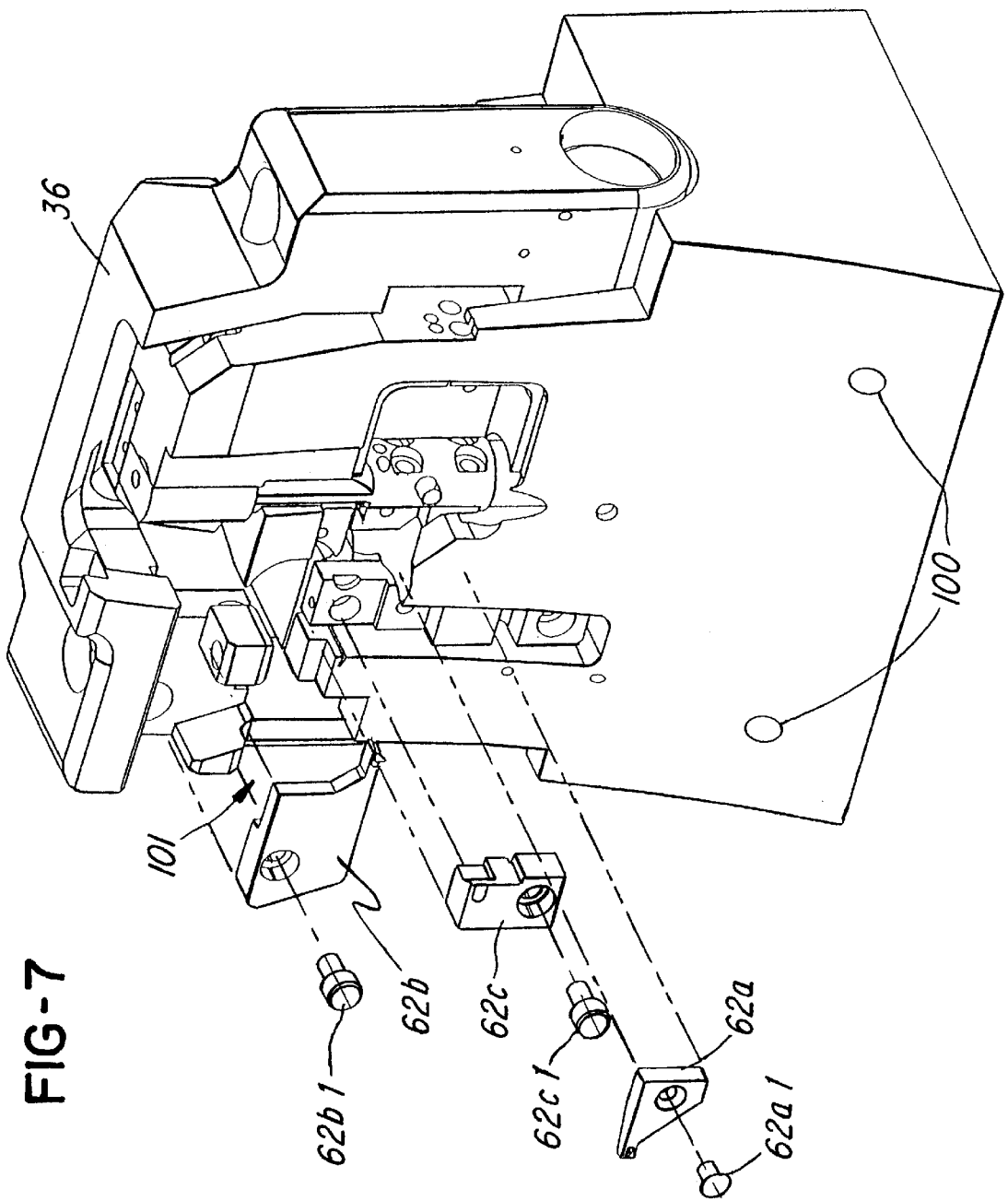

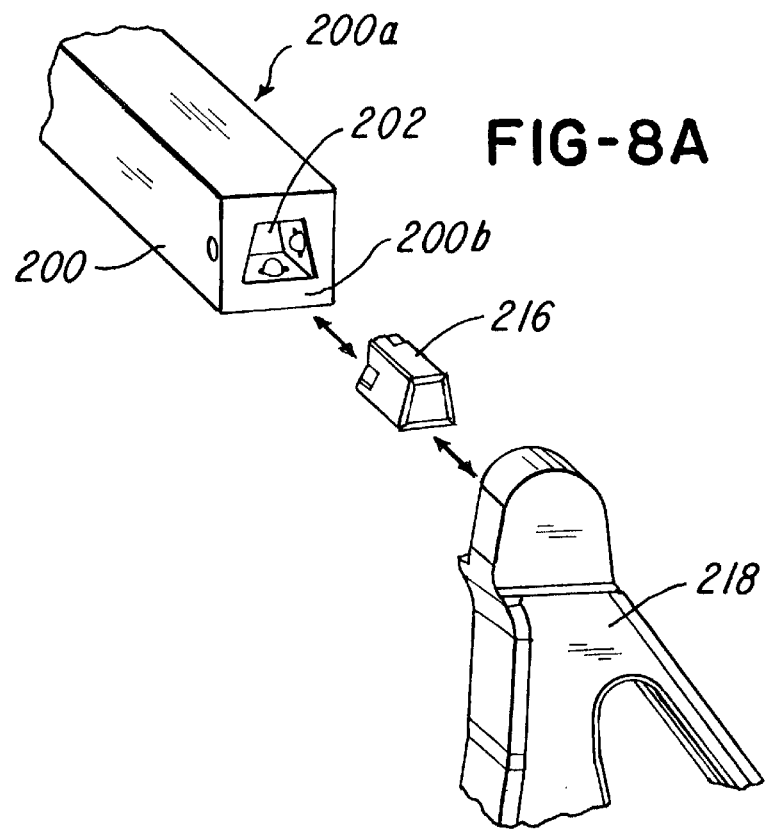
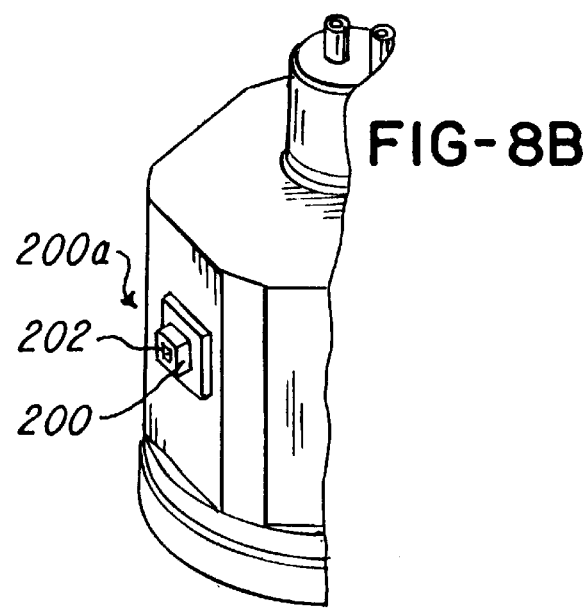

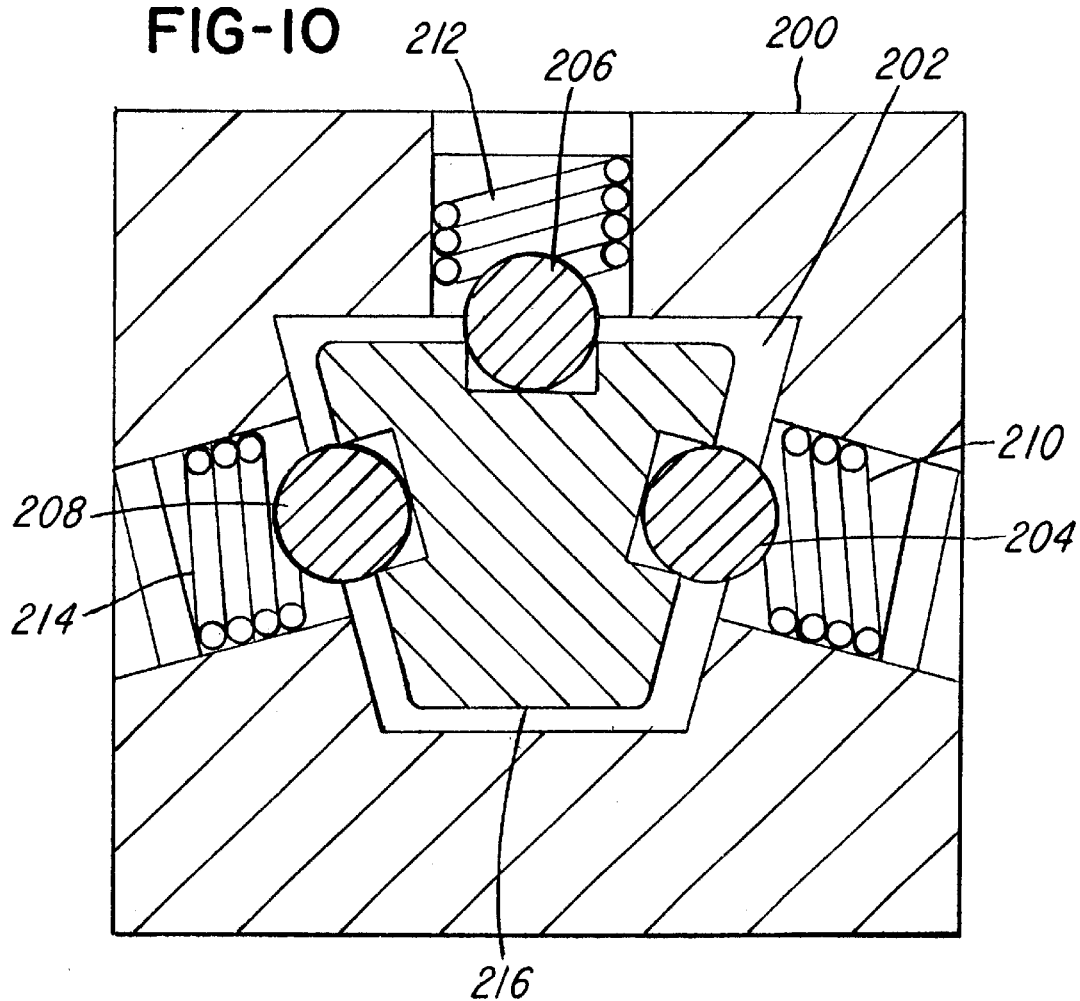

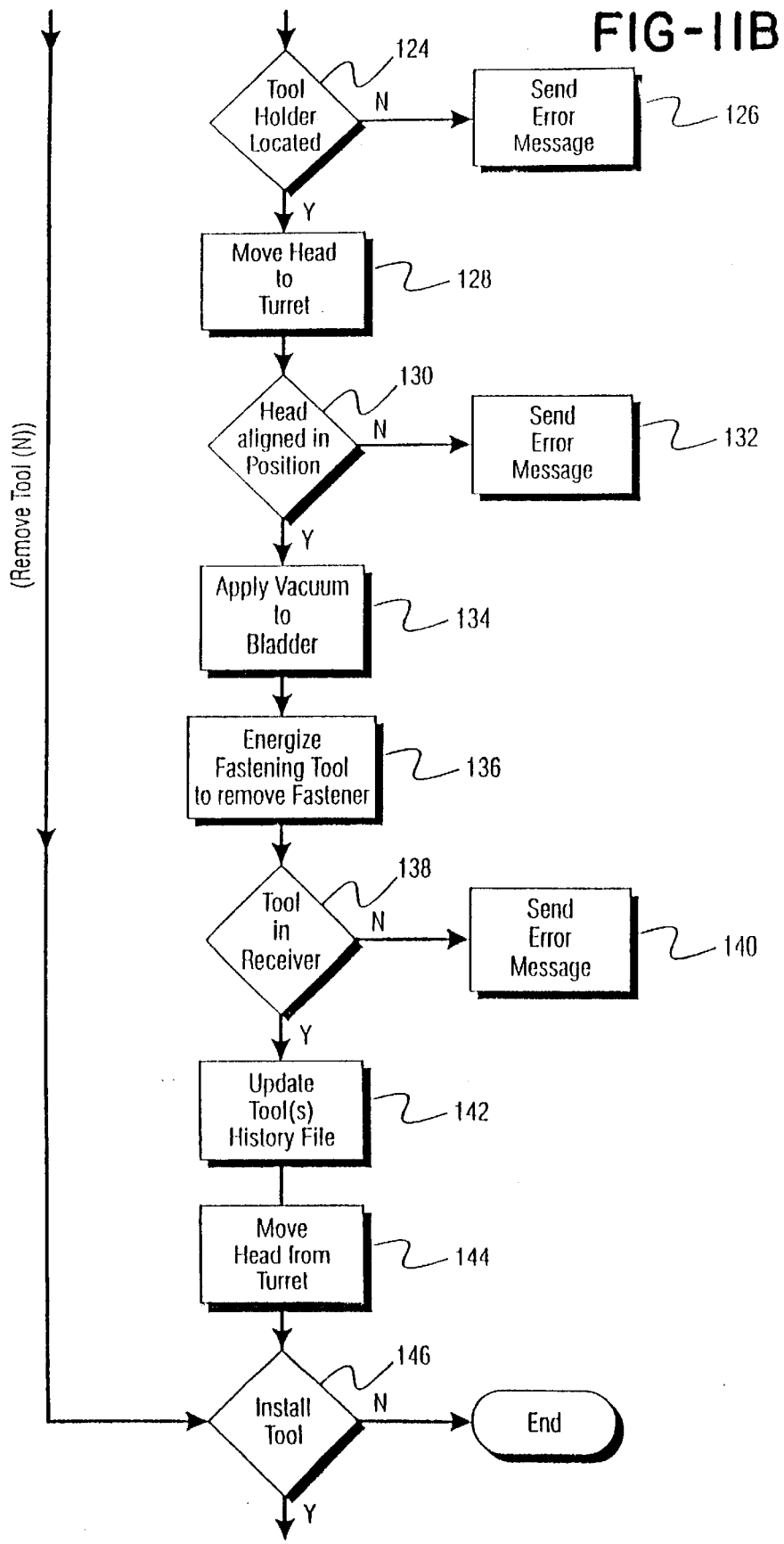

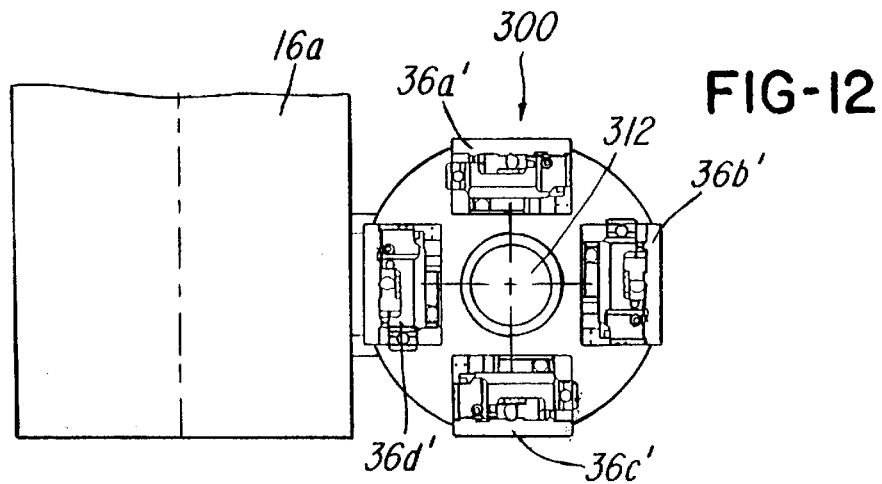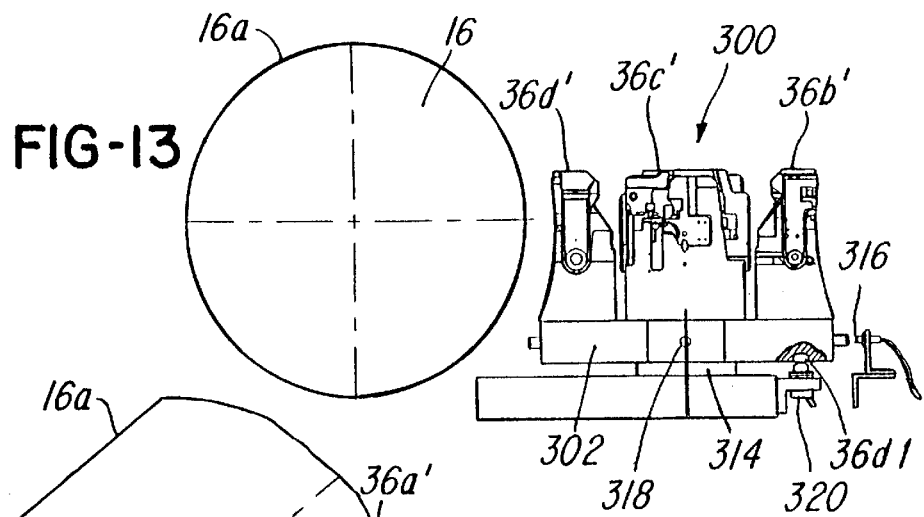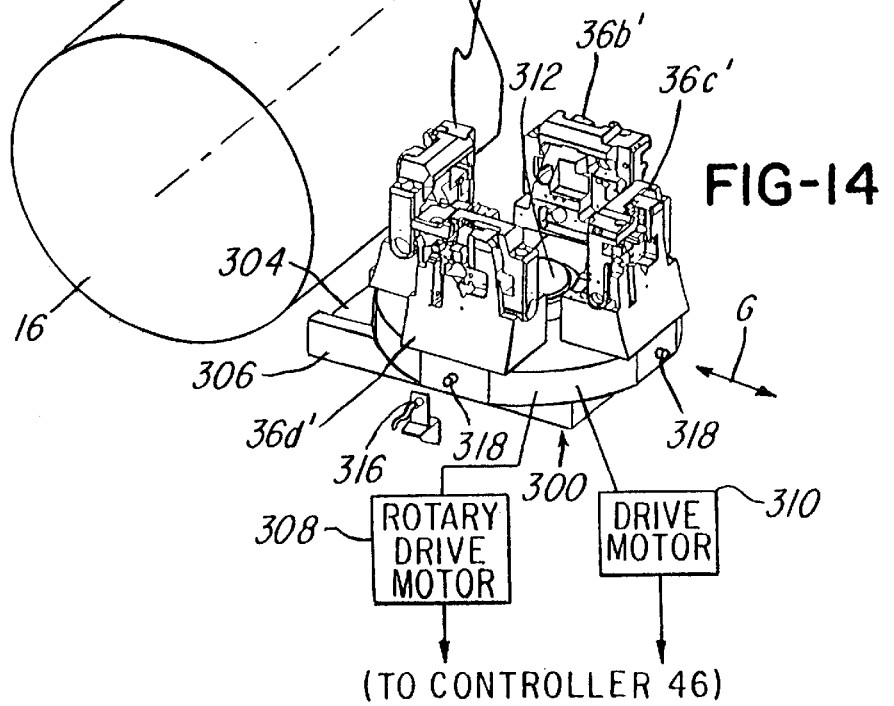

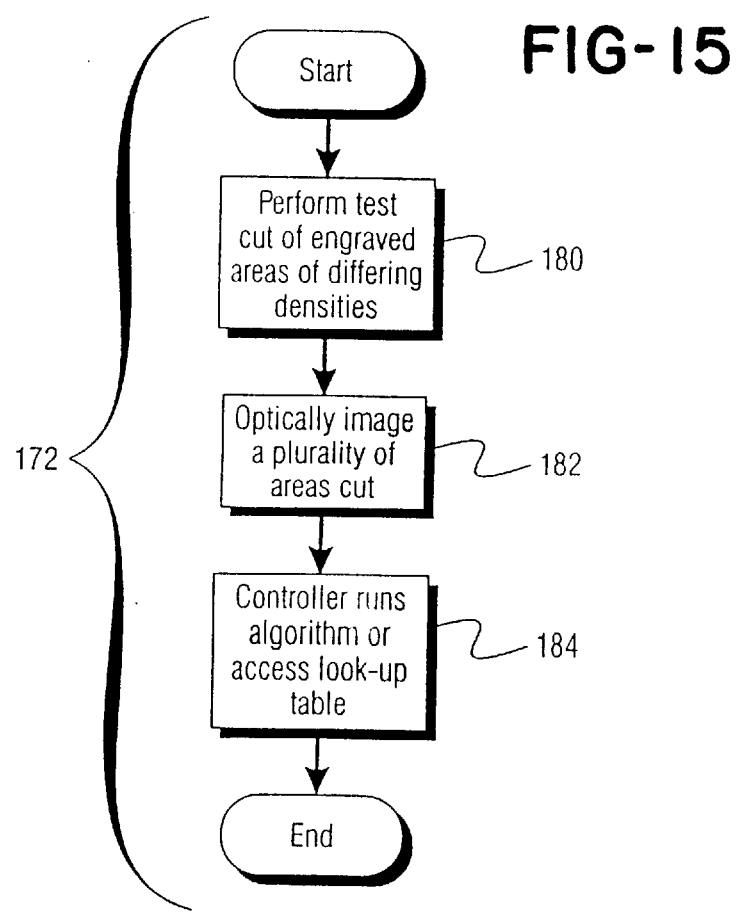

ENGRAVER WITH AUTOMATIC TOOL CHANGER

CROSS-REFERENCE TO RELATED APPLICATIONS

This application is a continuation-in-part of application Ser. No. 08/476,093, filed Jun. 7, 1995 now allowed, which is a continuation of Ser. No. 08/125,938 filed Sep. 23, 1993, now U.S. Pat. No. 5,440,398, which is a continuation-in-part of application Ser. No. 08/038,679, filed Mar. 26, 1993, now issued as U.S. Pat. No. 5,438,422, which is a continuation-in-part of Ser. No. 08/022,127 filed Feb. 25, 1993, now U.S. Pat. No. 5,424,845.

BACKGROUND OF THE INVENTION

1. Field of the Invention

This invention relates to an engraver, and more particularly, systems and methods for automatically changing tools or components mounted on an engraving head, switching engraving heads and verifying a tool situated on the engraving head on the engraver.

2. Description of the Related Art

The basic principle of electro-mechanical engraving of a gravure cylinder involves rotating a plated cylinder while actuating an electronically driven tool or stylus which cuts or engraves engraved areas, cells or lines of engraved areas into a surface of the plated cylinder. The engraved cylinder is normally used in a web-type gravure printing press for printing paper, plastic, metallic film material or other printed material. In the gravure printing process, the engraved cylinder is flooded with ink, and a doctor blade wipes off excess ink from the surface of the cylinder so that the engraved cells or lines of cells contain an appropriate amount of ink which is transferred to the material being printed.

To obtain a high quality print, it is necessary that the cells be very accurately placed, located or engraved on the cylinder surface, usually within one or two microns of a desired predetermined location. The depth of the engraved cells must also be accurately controlled since the depth determines the amount of ink transferred which, in turn, determines the shade of gray in a black/white print, for example. In a color print, the amount of ink transferred to the paper or materials is even more critical since multiple colors are typically mixed to produce various shades of all possible colors. A slight variation in the desired amount of ink affects not only the color, but, more importantly, the density of the desired color.

In order to properly control the depth of the cells, the relative location between the plated cylinder and the electrically driven tool, which is typically a diamond stylus, must be accurately controlled. In order to ensure that the stylus is maintained at a constant distance from the plated cylinder as the cylinder rotates in the engraving process, the engraving head containing the stylus is provided with a diamond shoe tool which contacts the cylinder to maintain a desired predetermined spacing between the stylus and the cylinder.

When the stylus exits an engraved area or cell, a burr of material is commonly created around the edges of the cell, and the burr material, is removed by a diamond burr cutter mounted on the engraving head adjacent to location of the diamond stylus and the diamond shoe tool. Past burr cutters have comprised diamond tools having a cutting edge which is located over the center of an engraved cell or row of engraved cells to remove the burr material. The alignment between the burr cutter and the cylinder would vary with variations in the diameter of the cylinder such that it was necessary for an operator to perform an alignment operation and to place the cutter in tangential engagement with the cylinder surface whenever the cylinder diameter was changed.

U.S. Pat. No. 5,475,914 illustrates a simplified system and method showing tools on the engraving head formed with a cartridge-style construction. For example, a cartridge diamond stylus is provided having a trapezoidal cross section for facilitating positive registration and position of the stylus within the engraving head. Other tools, such as a shoe and/or burr cutter are provided in a detachable cartridge arrangement to facilitate quick mounting and replacement of an existing shoe or burr cutter, respectively, such that the shoe or burr cutter also became aligned and registered on the engraving head.

It was not uncommon that, during the engraving process, one or more of the tools on the engraving head became worn, broken or otherwise need to be replaced for various reasons. For example, it was not uncommon that, when changing from one engraving job to another engraving job, it was sometimes necessary to change engraving stylus. In this regard, multiple styli were typically available with included cutting angles of between 90 and 145 degrees in five degree increments. One engraving job may require the use of a stylus having a 100 degree stylus angle, while a second engraving job may require the use of a stylus having a 135 degree cutting angle. Moreover, a single engraving job may require the use of several styli having different cutting angles.

It was not uncommon that other tools mounted on the engraving head had to be changed periodically as well. Sometimes, the tools were manually changed at periodic maintenance intervals after a tool had a predetermined number of engraving hours thereon. If a stylus would happen to break between such maintenance intervals and such break was not detected, then the engraver would continue attempting to perform engraving with the broken stylus. This sometimes resulted in an inferior or unacceptable engraving quality. If this occurred, then the broken stylus caused the surface of the cylinder to be damaged, sometimes beyond repair to a degree that the entire cylinder became scrap.

Unfortunately, the changing of tools on the engraving head was a time consuming manual process. The engraving head had to be halted or stopped during the changeover, thereby resulting in engraving downtime.

Also, there was no convenient method or system for using multiple tools, such as multiple styli, without changing the tools.

Still another problem is that it would sometimes occur that due to operator error, for example, the stylus mounted on the engraving head was incorrect because, for example, it had an incorrect cutting angle. Some engraving systems of the past could optically detect a broken stylus, but they could not verify its cutting angle.

Accordingly, there is a need for an improved engraving system and method which facilitates a quick and automatic change over of one or more tools on one or more engraving head, which can provide multiple tool set capability and which has tool verification capability.

SUMMARY OF THE INVENTION

The primary object of the present invention is to provide an automatic tool changing system and method for changing tools on at least one engraving head.

Another object of the invention is to provide an engraver which uses multiple engraving heads, each having a dedicated set of tools, thereby enabling the engraver to change from one set of tools to a second set of tools as desired.

Another object of the invention is to provide an engraver which will reduce the need for changing tools by providing a plurality of interchangeable engraving heads, each having a dedicated set of tools.

Still another object of the invention is to provide an engraver including a tool verification system for verifying that a correct or desired tool, such as a stylus having a desired stylus angle, is mounted on the engraving head.

In one aspect, this invention comprises an automatic engraver tool changing method comprising the steps of determining when a tool on an engraving head needs to be changed, and automatically mounting a replacement tool if it is determined during the determining step that the tool needs to be changed.

In another aspect, this invention comprises an engraver comprising a controller for controlling the operation of the engraver, an engraving head coupled to the controller for engraving an engraved pattern on a workpiece situated on the engraver, the engraving head having at least one tool mounted thereon, and an automatic tool changer situated on the engraver for automatically changing at least one tool.

Another object of the invention is to provide an engraver that permits a tool change during operation of the engraver.

Another object of the invention is to provide an engraver which facilitates reducing or eliminating downtime associated with changing tools.

Another object of the invention is to provide an engraver which utilizing multiple heads to reduce or eliminate the need for a tool change.

Other objects and advantages of the invention will be apparent form the following description, the accompanying drawings and the appended claims.

BRIEF DESCRIPTION OF THE ACCOMPANYING DRAWINGS

FIG. 3 is a fragmentary side view illustrating the engraving head in operative relationship with the tool changer;

FIG. 4 is a fragmentary perspective view showing more details of the tool changer in operative relationship with the engraving head;

FIG. 5 is a partly broken away view of the tool changer illustrating a fastener tool and the air bladder associated with a work holder area on the tool changer;

FIG. 6 is a perspective exploded view of the tool changer showing the various cartridge tool exploded from the tool changer;

Figure 9:
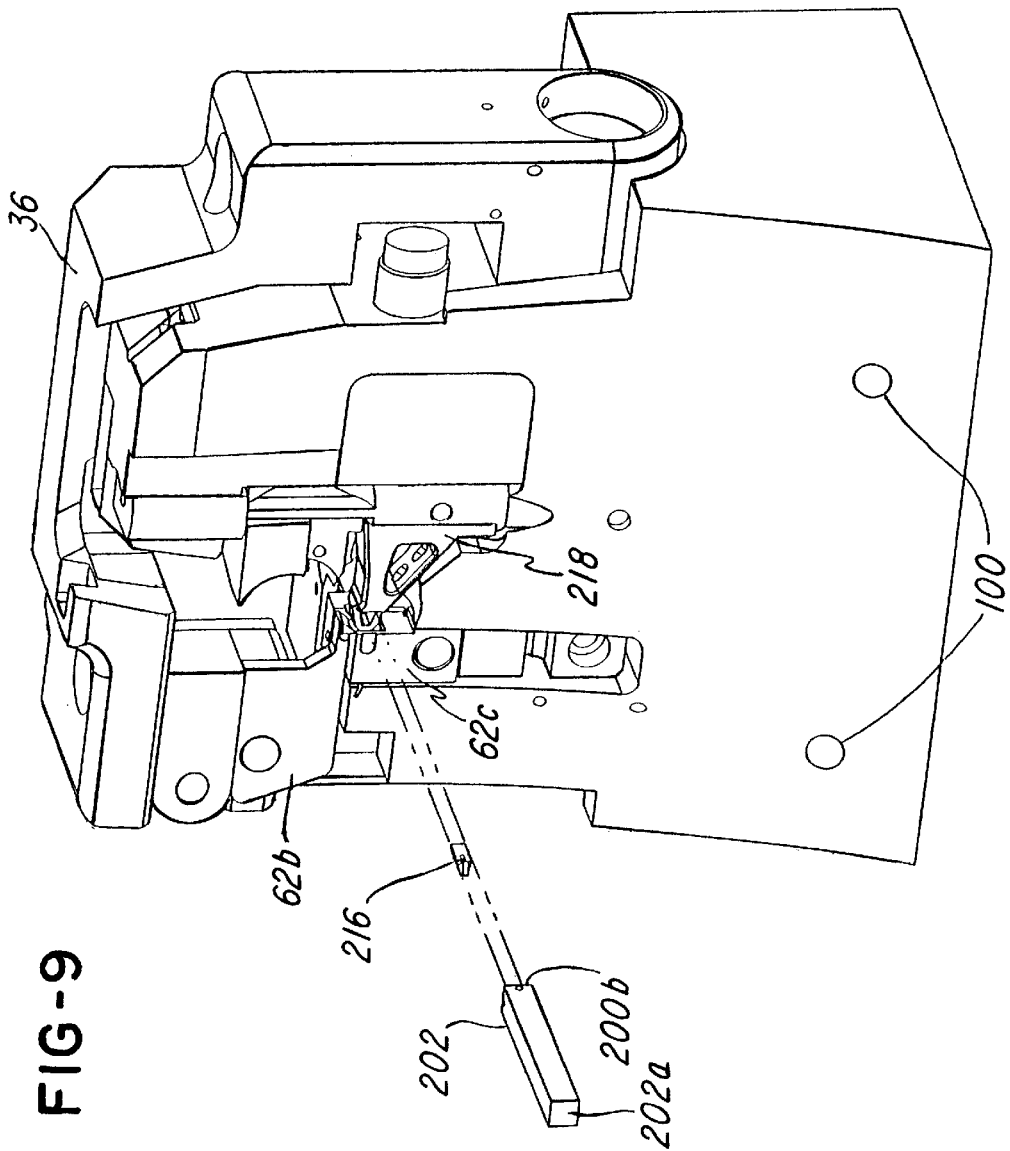

FIG. 7 another exploded view illustrating the position of the cartridge tools on the engraving head;

FIG. 8a is an exploded view illustrating the use of a stylus changing tool to change a stylus on a stylus arm;

FIG. 8b is a fragmentary view of the stylus changing tool shown in FIG. 8a and mounted on the tool changer;

FIG. 9 is another view of the stylus changing tool used to change the stylus on the stylus arm;

FIG. 10 illustrates the detents used to secure the stylus in a locked position in the stylus changing tool shown in FIG. 8a;

FIGS. 11A–11D show a process or method for affecting an automatic tool change over in accordance with one embodiment of the invention;

FIG. 12 is a top view of an engraving head turret assembly showing multiple engraving heads on a rotatable turret;

FIG. 13 is a side view of the engraving head turret system shown in FIG. 12;

FIG. 14 is a perspective view illustrating the relationship between the cylinder and the engraving head turret system shown in FIG. 12;

FIG. 15 is a schematic of a tool verification algorithm for verifying that a tool mounted on the engraving head is the correct tool; and FIGS. 16A–16D are various fragmentary views showing engraved areas comprising differing densities and the corresponding measurements used by the verification routine shown in FIG. 15.

DETAILED DESCRIPTION OF THE PREFERRED EMBODIMENT(S)

Figure 1:
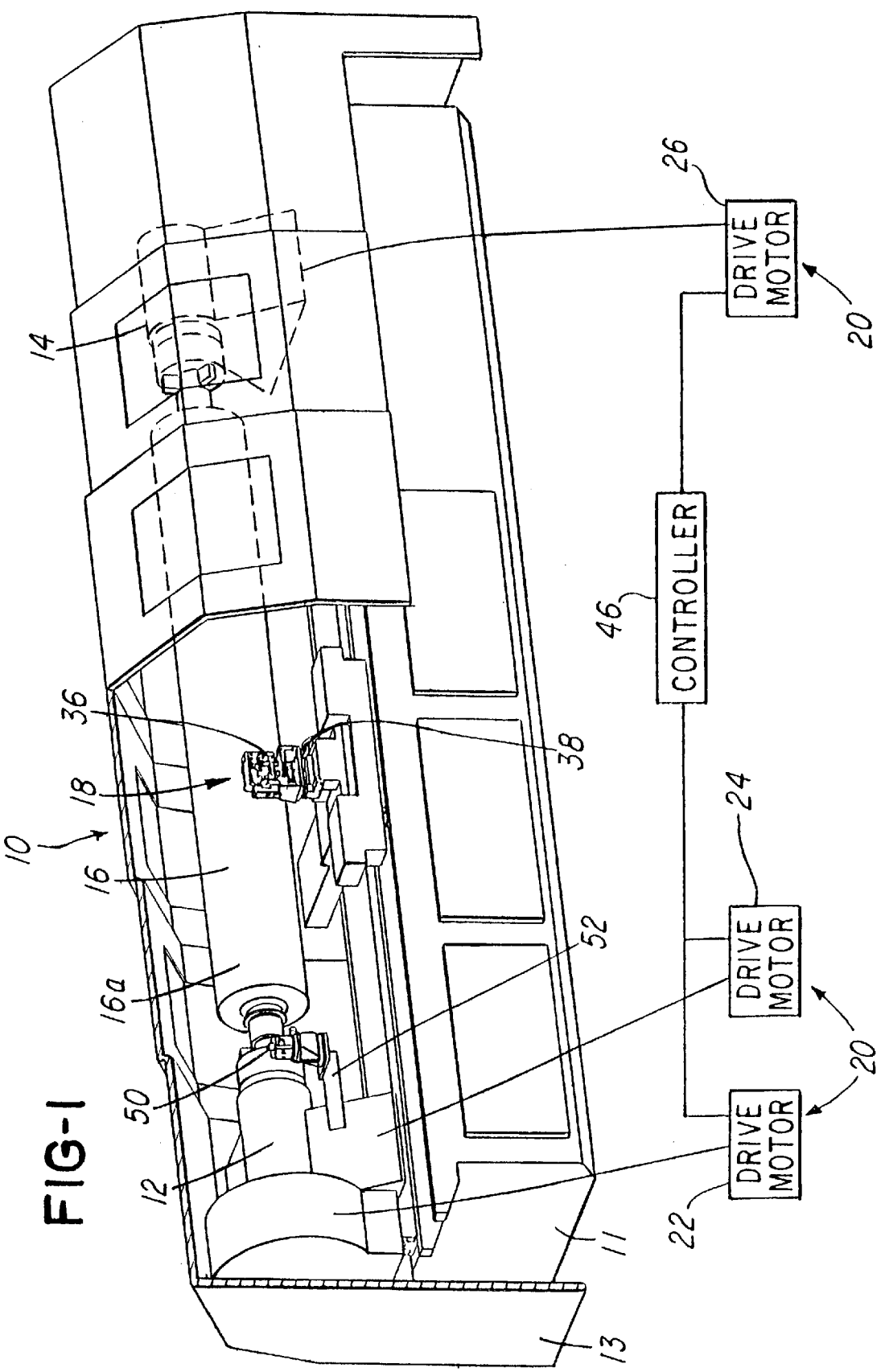
FIG. 1 is a partly broken away isometric view of the engraving system in accordance with one embodiment of the invention.

Referring now to FIG. 1, an automatic tool changing system comprises an engraver 10 having an engraving bed 11 with an ornamental enclosure or housing 13 situated thereon. The ornamental enclosure 13 could be many alternative shapes and can telescope open and closed as needed to provide access inside the ornamental enclosure 13.

The engraver 10 comprises a headstock 12 and a tailstock 14 for rotatably supporting a cylinder 16 at an engraving station 18. The engraver 10 also comprises drive means 20 including a motor 22 for rotatably driving the cylinder 16 in rotational movement about its longitudinal axis. The drive means 20 further comprises a plurality of motors 24 and 26 for driving headstock 12 and tailstock 14 towards and away from each other such that they can rotatably support cylinder 16 at the engraving station 18.

Figure 2:
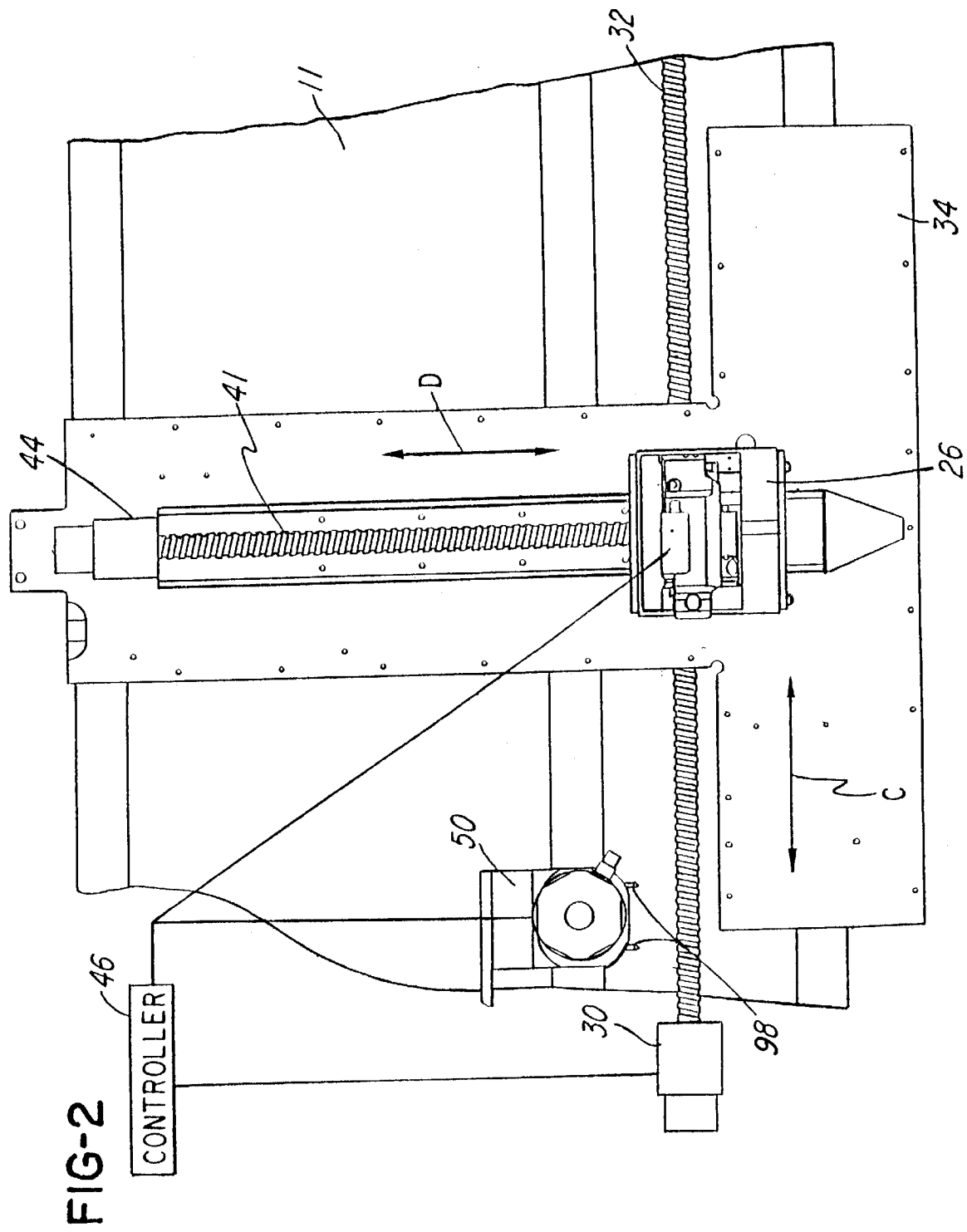
FIG. 2 is a fragmentary top view showing details of the engraving head tearage and an automatic tool changer.

As best shown in FIG. 2, the engraver 10 further comprises an engraving head drive system (FIG. 2) including a drive motor 30 for driving a lead screw 32 in order to drive a carriage 34 in the direction of double arrow C across the bed 11 of engraver 10 in order to engrave a pattern (not shown) of engraved areas on a surface 16a of cylinder 16 in a manner which is conventionally known.

The engraver 10 further comprises an engraving head 36 which is mounted on a platform 38 (FIG. 3) of the type shown and described in U.S. Pat. No. 5,454,306 which is assigned to the same assignee as the present invention and which is incorporated herein by reference and made apart hereof. The platform 38 is, in turn, mounted on a support 40 which is threadably coupled to a lead screw 41 which is rotatably driven by a drive motor 44 to cause engraving head 36 to move in the direction of double arrow D (FIG. 2) such that engraving head 36 can move towards and away from cylinder surface 16a. In an alternate embodiment described later herein relative to FIGS. 12–14, the engraving head 36 which is mounted on platform surface 38a, may be replaced with an engraving head turret system or arrangement 300 (FIG. 13). The operation and use of the engraving head turret arrangement 300 is described later herein.

The engraver 10 further comprises means for controlling or a controller 46 (FIG. 1) which is coupled to drive means including drive motors 22, 24, 26, 30 (FIG. 2) and 44, as well as engraving head 36 and controls the operation thereof in order to effect engraving a desired engraved pattern.

The engraver 10 further comprises tool changing means or an automatic tool changer 50 (FIG. 4) which is mounted on an L-shaped bracket 52 (FIG. 1) which, in turn, is mounted via suitable fasteners (not shown) directly to headstock 12.

The tool changer 50 comprises a tool changer positioning means (FIG. 4) or a positioner 51 comprising a horizontal cross-roller slide mechanism 54 and a vertical cross-roller slide mechanism 56. The cross-roller slide mechanisms 54 and 56 facilitate enabling tool changer 50 to move in the direction of double arrows E and F, respectively, such that a horizontal and vertical position of tool changer 50 may be changed or self-aligned relative to engraving head 36 so that it may be aligned therewith in a manner described later herein.

Thus, as tool changer 50 engages engraving head 36, the tapered pins 78 (FIG. 2) engage apertures 100 (FIG. 7) and cause the turret 58 to become self-aligned relative to the engraving head 36 via cross-roller slides 54 and 56. In the embodiment being described, the slide mechanisms 54 and 56 available from TUSK, Inc. (model no. RT1-4) of Connecticut have been found to be suitable.

The tool changer 50 comprises a turret 58 which is rotatably mounted on platform 53 (FIGS. 3–5). In this regard, the platform 53 comprises a plurality of bearings (not shown) situated between the turret 58 and the platform 53 for facilitating the rotation movement of the turret 58 relative to the platform 53.

The tool changer 50 further comprises a drive motor 60 (FIG. 5) coupled to and responsive to controller 46 which is capable of rotatably driving turret 58 in a manner described later herein. In this regard, notice that motor 60 comprises a bevel gear 60*a* (FIG. 5) which cooperates with a mating gear 55 to rotatably drive the turret 58 relative to platform 53.

As best shown in FIG. 6, turret 58 (FIG. 6) comprises a plurality of generally planar surfaces 58*a*, 58*b*, 58*c*, 58*d*, 58*e* and 58*f*. Each surface 58*a*–58*f* comprises a plurality of locating fingers or latches, such as latches 58*b*-1 to 58*b*-4, which cooperate to define a plurality of individual tool holders 64*a*–64*f*. Notice that each tool holder 64*a*–64*f* comprises a geometric configuration which approximates or complements the geometric configuration or shape of a tool (such as a stylus tool 62*a*, burr cutter tool 62*b* or shoe tool 62*c*) which it receives. Thus, for example, tool holder 64*b* (which is defined by latches 58*b*-1 to 58*b*-4 associated with surface 58*b*) defines a shape which generally complements the shape of a perimeter of the burr cutter tool 62*b* which it receives.

Preferably, the tools are cartridge tools of the type shown and disclosed in U.S. Pat. No. 5,475,914, which is assigned to the same assignee as the present invention and which is incorporated herein by reference and made a part hereof. As illustrated in FIGS. 8–10, the stylus tool 62*a* comprises a removable cutter or stylus 103 described later herein. Thus, for example, as depicted in FIG. 6, notice that tool holder 64*b* is loaded with an unused burr cutter 62*b*, while the opposite wall 58*e* has tool holder 64*e* which is the same shape or configuration, but which is empty so that it can receive a used burr cutter tool (not shown) from engraving head 36.

Advantageously, the geometric shape of the cartridge tools 62 facilitate automatic, quick and accurate location into their mating tool holders 64*a*–64*f*. The cartridge tools 62 also facilitate direct mounting onto engraving head 36 which facilitates reducing and/or eliminating the need for manual intervention and has other advantages as outlined in the aforementioned U.S. Pat. No. 5,475,914.

Tool changer 50 further comprises pressure means or a pressure or air source 66 (FIG. 5) coupled to controller 46 for supplying both positive and negative pressure to facilitate the transfer of replacement tools from turret 58 to engraving head 36, as well as the transfer of worn or used tools from engraving head 36 to turret 58.

In this regard, notice that pressure source 66 is coupled to a multi-port rotary union 68 mounted on turret 58 comprising a positive pressure port 70 and a negative pressure port 72 which provides positive and negative (i.e., a vacuum) pressure through the rotary union 68.

The tool changer 50 further comprises another drive means or an electric motor 69 which is coupled to controller 46 and to a clutch assembly 74. The clutch assembly 74 comprises an output shaft (not shown) coupled to a beveled pinion gear 76 (FIG. 5).

The beveled pinion gear 76 drives a plurality of fastening and unfastening tools 84. Each tool 84 comprises a beveled ring gear 78 coupled to a two-piece spindle gear shaft 80 which is mounted in a sleeve 82. The two-piece spindle gear shaft 80 is spring loaded so that it is compressible along its axis such that a tool bit 84*a* may move, for example, in the direction of double arrow G. In operation, spindle gear shaft 80 drives the fastening and unfastening tools 84, such as hex tool 84*a*, in the embodiment being described.

It should be appreciated that there is a fastening and unfastening tool 84 associated with each of the tool holders 64*a*–64*f*. For example, notice in FIG. 5 fastening tool 85*a* associated with work holder 64*e* and tool 84 associated with work holder 64*b*. As shown in FIG. 6, each tool holder 64*a*–64*f* comprises an associated aperture 64*a*-1 to 64*f*-1, respectively, through which the bits, such as bits 84*a* and 85*a*, may move. The purpose of the tools 84 is to screw and unscrew fasteners, such as fasteners or screws 62*a*-1, 62*b*-1 and 62*c*-1 in FIG. 7 associated with cartridge tools 62*a*–62*c*.

As described in more detail later herein, at least one of the tool holders 64*a*–64*f* is preferably "loaded" with a predetermined quantity and type of replacement tools. In the embodiment being described, tool holders 64*a*–64*c* are loaded with unused, new or replacement tools 62*a*–62*c*, respectively. Likewise, some of the tool holders 64*a*–64*f* are "unloaded" so that they can receive a worn tool from engraving head 46. Thus, for example, tool holders 64*d*–64*f* are not "loaded" so that they are capable of receiving a worn or used tool from engraving head 36. Although not shown, the tool holders 64*d*–64*f* are configured and shaped identically as tool holders 64*a*–64*c*, respectively.

The turret 58 of tool changer 50 further comprises a plurality of channels which couple the pressure source 66 and ports 70 and 72 to inflatable air bladders 64*a*-2 (FIG. 6), 64*b*-2, 64*c*-2 and 64*e*-2 (FIG. 5) and associated with each holders 64*a*, 64*b*, 64*c* and 64*e*. The air bladders (not shown) for tool holders 64*d* and 64*f* are not shown because of the position of the tool changer 50 illustrated. For example, notice in FIG. 5 the plurality of channels 62*b*-5 and 62*b*-6 associated with tool holder 62*b*. A rotary valve body 71 comprises a rotary valve plate 71*a* which is coupled to tool holder 50. The valve plate 71*a* comprises six sets of pressure ports, such as ports 73*a* and 73*b*.

Each set of pressure ports comprises a positive and negative pressure aperture or valve which becomes coupled to ports 70 and 72, respectively, through a top valve body 71*b*.

The top valve body 71*b* is stationary relative to the rotary valve plate 71*a*. The top valve body 71*b* comprises a single set of pressure ports have a positive aperture or valve 75*a* and a negative pressure aperture or valve 75*b* which communicate with ports 70 and 72, respectively, to one of the sets of ports of the rotary valve plate 71*a*.

Notice in FIG. 5 a seal 71c provides a seal between rotary valve plate 71a and valve body 71b such that pressure leakage to any non-aligned ports is prevented. TEFLON® impregnated seals are preferred because of their lubricating and wear benefits which are well known.

It should be appreciated that when the tool changer 50 is situated in a tool changing position, such as is shown in FIGS. 3 and 4, the rotary valve body 71 causes the ports 70 and 72 to communicate only with the air bladder for the tool holder which is situated in opposed relationship to engraving head 36.

Each air bladder 64a-2 to 64f-2 comprises a plurality of air holes 88 (FIG. 6) which are operatively associated with their respective tool holder 64a-64f in order to permit either a positive or negative pressure to be applied to a tool situated in or near the tool holder 64a–64f. Thus, for example, when it is desired to force or transfer burr cutter tool 62b from turret 58 onto engraving head 36, controller 46 energizes pressure source 66 to supply a positive air pressure through port 70 to inflate air bladder 64b-2 to force the burr cutter tool 62b onto the engraving head 36. The controller 46 substantially simultaneously energizes the internal tool 84 associated with the aperture 90 to rotatably drive or screw fastener 62b-1 (FIG. 7) to securely fasten burr cutter 62b onto engraving head 36.

As a general sequence of operation, after a worn or used tool is removed from engraving head 36, the tool changer 50 is indexed to align an empty tool holder 64d–64f with the tool to be replaced on engraving head 36 so that it can be transferred or removed therefrom. After it is transferred, the turret 58, under operation of controller 46, is indexed so that a replacement tool situated on one of holders 64a–64c can be transferred or mounted on engraving head 36.

As will be described later herein, when it is desired to remove or transfer a worn or used tool 62 from engraving head 36 to turret 58, controller 46 energizes pressure source 66 to supply a negative pressure to port 72 which, in turn, provides negative air pressure to air holes (not shown) on air bladder 64e-1 (FIG. 5), for example, associated with tool holders 64e. Substantially simultaneously therewith, the appropriate tool 84, such as tool 85a in FIG. 5, unfastens or unscrews a fastener or screw (not shown) which secures the worn or used tool (not shown) on engraving head 36. The negative or vacuum pressure causes the used or worn tool to be removed or transferred from engraving head 36 into tool holder 64e on turret 58 in the embodiment being described.

To facilitate accurate indexing and alignment of turret 58 relative to engraving head 36, tool changer 50 further comprises an encoder 90 (FIG. 6) coupled to both motor 60 and controller 46 for providing accurate information regarding the rotational speed and position of turret 58 relative to engraving head 36.

Further, the tool changer 50 comprises position sensing means or an index position proximity sensor 92 (FIG. 5) coupled to controller 46. The sensor 92 cooperates with at least one proximity target 94 to provide accurate information as to the rotational speed and position of each tool holder 64a-64f relative to engraving head 36 when the engraving head 36 and turret 58 are in a tool transfer position illustrated in FIG. 4.

In general, when it is desired to transfer a tool 62 between tool changer 50 and engraving head 36, the controller 46 selectively energizes the motors 30 and 44 to operatively position the turret 58 of tool changer 50 in tool changing position relationship with engraving head 36. To facilitate proper alignment and engagement between turret 58 and engraving head 36, tool changer 50 comprises a plurality of tapered pins 98 (FIG. 2) which cooperate with a plurality of mating apertures 100 (FIG. 7) to facilitate aligning the turret 58 to engraving head 36 when they are moved together.

Once the engraving head 36 and turret 58 are properly aligned relative to each other, controller 46 energizes drive motor 60 to rotatably drive turret 58 such that an appropriate empty tool holder 64d–64f is aligned with the worn or used tool to be replaced. Controller 46 energizes pressure source 66 to provide the negative pressure to air holes (not shown) for the air bladder associated with the tool selected. Substantially simultaneously therewith, controller 46 energizes motor 74 to rotatably drive the unfastening tool associated with the selected work holder, such as tool 85a, for example, in a counter-clockwise direction in order to unfasten the fastener associated with the worn or used tool being replaced. The negative air pressure causes the worn or used tool to be positioned in its appropriate tool holder 64a–64f.

Once the tool 62 being replaced has been transferred from engraving head 36 into its respective tool holder, such as holder 64e on turret 58, then controller 46 energizes drive motor 60 to rotatably index turret 58 until sensor 92 and encoder 90 senses that a replacement tool (such as tool 62b) is positioned in alignment with engraving head 36. At this point, controller 46 energizes pressure source 66 to provide a positive pressure to the plurality of air holes 88 associated with the tool holder aligned adjacent to engraving head 36 in order to force or transfer the tool from turret 58 onto engraving head 36. Controller 46 subsequently energizes motor 74 to drive fastening tool 84 in order to screw the fastener 62b-1 (FIG. 7) such that the cartridge tool 62b becomes securely fastened onto engraving head 36.

FIG. 7 illustrates the engraving head 36 with various cartridge components or tools 62a, 62b and 62c exploded away from engraving head 36. An automatic tool changing means comprising a method for automatically changing these tools will now be described relative to FIGS. 11A–11D.

The method begins by programming controller 46 (block 102 in FIG. 11A) with a plurality of parameters for determining when a tool needs to be changed. These parameters may include a maintenance schedule for changing one or more of the tools 62 (such as the stylus, burr cutter or shoe tools) at periodic maintenance intervals. The maintenance interval may correspond to when an engraving job has been performed or after the tool has been used for a predetermined number of engraving hours. Alternatively, an operator may program an automatic tool change, for example, when it is necessary to change a stylus due to a change in the shape of an engraved area or cell (not shown). This may be particularly useful when changing a stylus, such as a stylus 186 (FIG. 8a).

As described later herein relative to FIGS. 14 and 15, an optical system (not shown) may be utilized to detect a worn tool 62, such as a worn stylus 62a, as well as confirm or verify that a replacement stylus is the correct stylus. Once the worn or broken tool 62 is encountered, controller 46 can initiate the automatic tool change sequence. The teachings of U.S. Pat. Nos. 5,424,845 and 5,424,845 may be beneficial when optically detecting tool wear and stylus angle. These patents are incorporated herein by reference and made a part hereof.

Figure 11A:
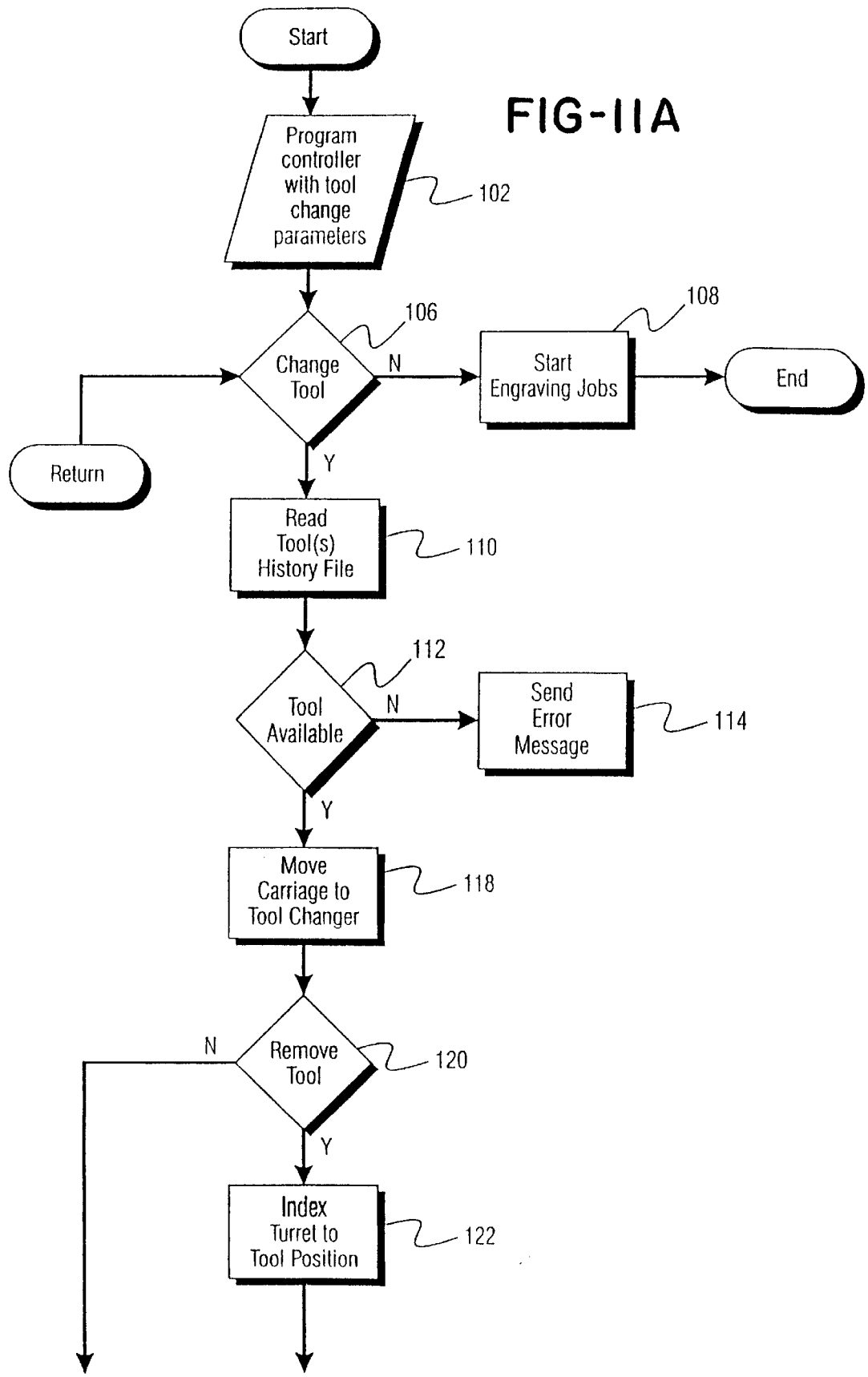
Figure 11C:
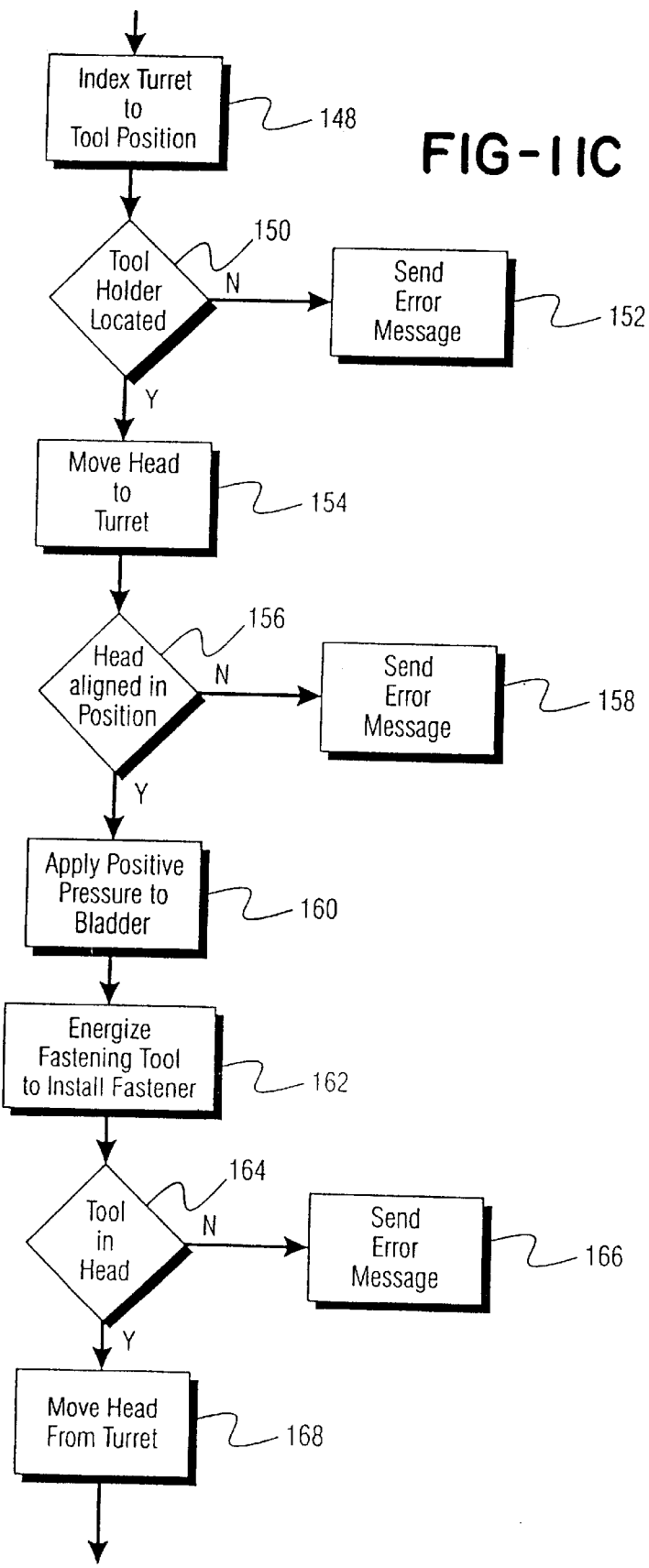

As illustrated in FIG. 11A, the controller 46 is programmed (block 102) with tool change parameters which may be influenced by the job being engraved, operator input parameters and/or a tool history file (not shown) corresponding to the tool wear or break history for the tools used on engraving head 36. The controller 46 uses the tool change parameters to determine (block 106) whether one or more of the tools 62 on engraving head 36 needs to be changed. If it does not, then the method proceeds to block 108 and the system starts engraving job.

If the decision at decision block 106 is yes, then the routine proceeds to block 110 where controller 46 reads the tool history file for the tool 62 being changed. As mentioned earlier, the tool history file is a historical record for the tool which records information (such as hours of usage and tool type) for one or more of the tools on the engraving head 36.

At decision block 112, controller 46 uses the tool history file to determine whether one or more of the replacement tools, such as tool 62a–62c in holders 64a–64c, respectively, is available on turret 58. If it is not, then an error message is sent (block 114) to notify an operator that the worn tool on engraving head 36 needs to be changed, but that there is no replacement tool 62a–62c available. The error message could be any suitable message, such as an alarm, a display, or the like. If it is determined at decision block 112 that a replacement tool 62a–62c is available, then the routine proceeds to block 118 where controller 46 energizes motors 30 and 44 (FIG. 2) to cause relative movement between the engraving head 36 and tool changer 50 until they become generally aligned in the tool change position mentioned earlier.

At decision block 120 (FIG. 11A), it is determined whether it is desired to remove the worn tool 62, and if it is, then controller 46 energizes motor 60 to index turret 58 to a tool address (block 122) such that one of the empty tool holders 64d–64f corresponding to the tool 62 being replaced is proximately located in opposed relationship to the tool being replaced as best illustrated in FIG. 4. Once the appropriate empty tool holder 64d–64f is aligned, it is determined at decision block 124 (FIG. 11B) whether the tool being replaced is aligned with tool holders 64d–64f. To facilitate such detection, controller 46 utilizes sensor 92 and target 94 (FIG. 5) and encoder 90 to provide information as to the relationship between tool holders 64a–64f and engraving head 36. If the head 36 and appropriate tool holder 46d–64f are not aligned, then controller 46 generates an error message (block 126) to signal the operator that the tool holder 64d–64f is not properly located relative to engraving head 36.

If the decision at decision block 124 is yes, then controller 46 energizes drive motor 44 (FIG. 2) to drive engraving head 36 toward turret 58 until aligning pins 98 (FIG. 2) are received in apertures 100 (FIG. 7). At this point, the tool 62 being replaced becomes substantially aligned and received in its appropriate tool holder 64d–64f (block 128).

At decision block 130, if engraving head 36 is not in position relative to tool changer 50, then an error message (block 132) is sent to the operator in the same manner noted above. In this regard, engraver 10 may comprise tool changer position sensing means or a position sensor, such a sensor 99 (FIG. 4), situated on engraving head 36 and coupled to controller 46 for detecting the position of turret 58 relative to engraving head 36. In the embodiment being described, the position sensor 99 may be a conventional proximity sensor. As mentioned earlier herein, the location of turret 58 relative to engraving head 36 is achieved when pins 98 (FIG. 2) are received in aperture 100 (FIG. 7).

If the decision at decision block 130 is yes, then the tool 62 being replaced is aligned with and received in its appropriate receiving tool holders 64d–64f and controller 46 energizes pressure source 66 to apply vacuum pressure (block 134) to pressure port 72.

It should be appreciated that the fastening tool, such as tool 84 (FIG. 5), operatively engages the fastener or screw (not shown) which secures the worn tool to engraving head 36. Simultaneously, the controller 46 energizes motor 74 (block 136) to drive tool 84 (FIG. 5) in a counter-clockwise direction in order to unscrew or unfasten the fastener or screw associated with worn tool 62 so that the worn tool 62 can be removed from the engraving head 36.

Once the worn tool is unfastened, the vacuum applied at block 134 causes the worn tool to be transferred from the engraving head 36 to the tool changer 50.

At decision block 138 it is determined whether the tool is properly received in tool holder 64a by a pressure transducer 66a (FIG. 5) which senses the pressure change when tool 62a is received in tool holder 64a and generates a voltage or sensed signal in response. If the voltage measured is less than a predetermined threshold, then an error signal is generated and an error message is sent to the operator (block 140) in response thereto. Conversely, if the voltage measured at the pressure transducer is equal to or greater than the established threshold value, then the routine will continue to block 142 where controller 36 begins writing and/or updating a tool history file for the tool 62 which was removed.

The tool file history comprises a record of total hours that the tool has been used between tool regrinds and/or refurbishes, in addition to notating the evidence of chips or deformities in the tool as a result of wear and/or handling. These wear characteristics are recorded optically, and stored in controller 46 using special codes developed to directly pertain to the distinct wear patterns. The overall value of this tool file history is for alerting the operator to the condition that the need to change a tool is now present, and if performed in a timely manner, preferably prior to the next engraving job, a potential aborted engraving job in the near term can be avoided.

At block 144, controller 46 energizes motor 44 (FIG. 2) to cause engraving head 36 to be driven away from turret 58.

At decision block 146, it is determined whether it is desired to install a replacement tool, such as one of the replacement tools 62a–62c, to replace the worn tool removed from engraving head 36. If it is not, then the routine ends. If it is desired to mount a replacement tool onto engraving head 36, then controller 46 energizes motor 60 (FIG. 5) to rotatably drive turret 58 to a replacement tool address (block 148). This address corresponds to the position at which the replacement tool to be mounted on engraving head 36 is situated such that it is ready to mount on engraving head 36. For example, if it was desired to transfer burr cutter tool 62b onto head 36, then the turret 58 is indexed until the tool holder 64b and replacement burr cutter tool 62b are aligned with a burr cutter location 101 (FIG. 7) on engraving head 36. In order to facilitate such alignment, the slide mechanisms 54 and 56 self-align to adjust the position of tool changer 50 relative to engraving head 36 so that the replacement tool 62b on tool changer 50 is properly aligned with the area, such as area 101 (FIG. 7), where it is to be located on engraving head 36.

At decision block 150 in FIG. 1C, it is determined whether or not the replacement tool requested (required by downloaded engraving job) is actually resident at a position in the turret tool changer 50. The individual address of each replacement tool in the tool changer 50 is scanned for confirmation of tool configuration. If no tool is found (i.e., the tool holder for that tool is empty), or there is an absence of a tool matching the required configuration, an error message is sent to the operator apprising of the condition. If it is not, then an error message is generated (block 152) in order to notify the operator that the replacement tool is not located properly relative to the engraving head 36. If the decision at decision block 150 is yes, then the engraving head 36 and turret 58 are moved relative to each other (block 154) until the tapered alignment guide pins 98 (FIG. 2) become situated in apertures 100 (FIG. 7).

At decision block 156 (FIG. 11C), it is determined whether or not the engraving head 36 is in proper position relative to tool changer 50. If it is not, then an error message is generated by controller 46 and the operator is notified (block 158). If the decision at decision block 156 is yes, then controller 46 energizes pressure source 66 to apply a positive pressure to port 70 (FIG. 5) so that a positive air pressure is applied to the replacement tool in order to force the tool away from turret 58 (block 160 in FIG. 11C). For example, if it was desired to transfer burr cutter tool 62b (FIG. 5) from turret 58 to the burr cutter tool area 101 (FIG. 7) of engraving head 36, then the air bladder 64b-2 is inflated to force burr cutter 62b onto engraving head 36.

Substantially simultaneously therewith, at block 162, controller 46 energizes drive motor 60 to rotate fastening tool 84 in a clockwise direction in order to screw the fastener 62b-1 (FIG. 7) associated with tool 62 in order to fasten the tool onto engraving head 36.

At decision block 164 in FIG. 1C, it is determined if the replacement tool, such as tool 62b, has been transferred to the engraving head 36. The method of tool transferral is through the technique of applying a small positive pressure above atmospheric while energizing the fastening tool motor. The fastener is permanently mounted via a retaining clip in the tool holder, and further, the fasteners geometry permits easy guidance and location with the corresponding female thread form in the (engraving head side) tool receiver. Tool transferral has occurred when the monitored fastening tool motor current achieves or exceeds a predetermined limit concurrent with the bladder maintaining a positive pressure state. If these two conditions (i.e., current limit and positive pressure state) are not met, then an error message is generated (block 166) and an operator is notified. If it is, then controller 46 energizes motor 44 (FIG. 2) to move engraving head 36 away from turret 58 (block 168 in FIG. 11C).

At decision block 170 (FIG. 11D), controller 46 determines whether a stylus tool was changed. If it was not, then the routine loops back to decision block 106 (FIG. 11A) as shown. If it was, then a stylus tool verification means or routine is performed (block 172). The verification means or routine is shown in FIG. 15.

Figure 16A:
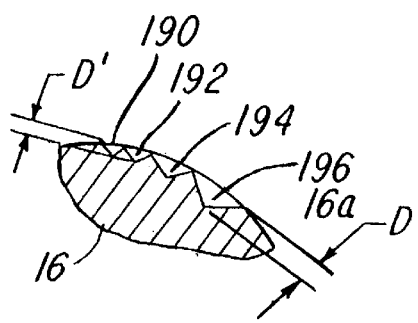
Figure 16B:
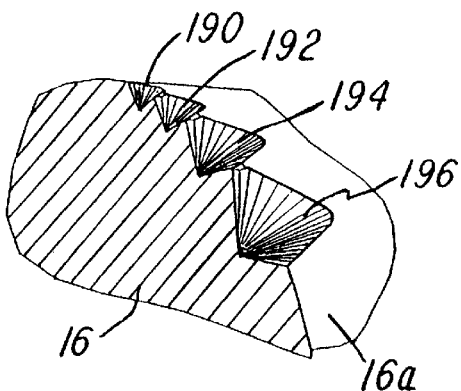
Figure 16C:
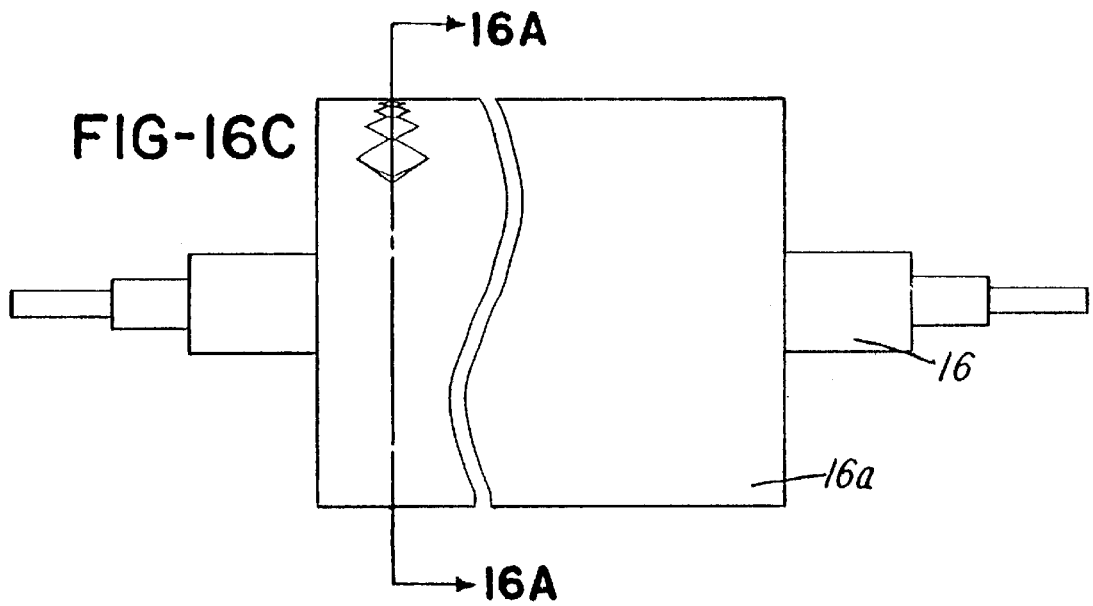

As best illustrated in FIG. 15, the stylus tool verification routine begins at block 180 by the performance of a test cut of a plurality of cells having varying densities or depths as illustrated in FIGS. 16A–16D. For example, as illustrated in the fragmentary sectional view of FIG. 14B, a plurality of engraved areas such as areas 190, 192, 194 and 196 comprise densities of 25%, 50%, 75% and 100%, respectively. It has been found that the depth of an engraved area it directly related to the DC voltage applied by controller 46 to the engraving head 36. Thus, for example, a change in the depth, for example, from engraved area 190 to engraved area 196 is also directly related to the change in the DC voltage used to engrave the engraved areas 190 and 196. As best illustrated in FIG. 16A, the depth for engraved area 190 is represented as D', while the depth for engraved area 196 is represented as D.

Figure 16D:
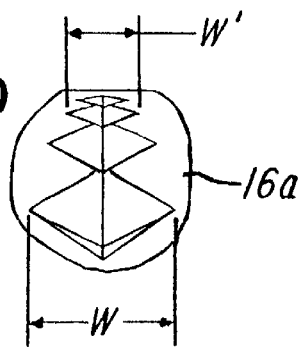

At block 182 (FIG. 15), the engraved areas 190–196 are optically imaged so that a width, such as widths W' and W in FIG. 16D may be determined. In this regard, the teachings of U.S. Pat. Nos. 5,424,845, 5,438,422 and 5,440,398 may be utilized to optically image the engraves areas 190–196 to obtain an engraved area width. These patents are assigned to the same assignee as the present inventions and are incorporated herein by reference and made a part hereof.

The engraved areas 190–196 are optically imaged to obtain W and W' (FIG. 14D). The controller 46 uses the values W and W' and the DC voltages corresponding to D and D' to determine an actual stylus angle $\propto$ using the following equation 1:

$$\text{Stylus angle } \propto\; =\; 2\tan^{-1}\frac{(W-W')/2}{(D-D')}$$

Where:

(D-D')=the change in the DC voltage level applied by controller 46 to engraving head 36;

(W-W')=the change in the optically measured widths of the selected engraved areas.

Stylus angle $\propto$ is the actual cutting angle for the stylus tool used to engrave the engrave areas.

It should be appreciated that controller 46 may run an algorithm stored in memory (not shown) for determining the stylus angle or, alternatively, a look-up table (not shown) may be stored and used. For example, the look-up table may have values for (W-W') and (D-D') cross-referenced to a stylus angle $\propto$.

Figure 11D:
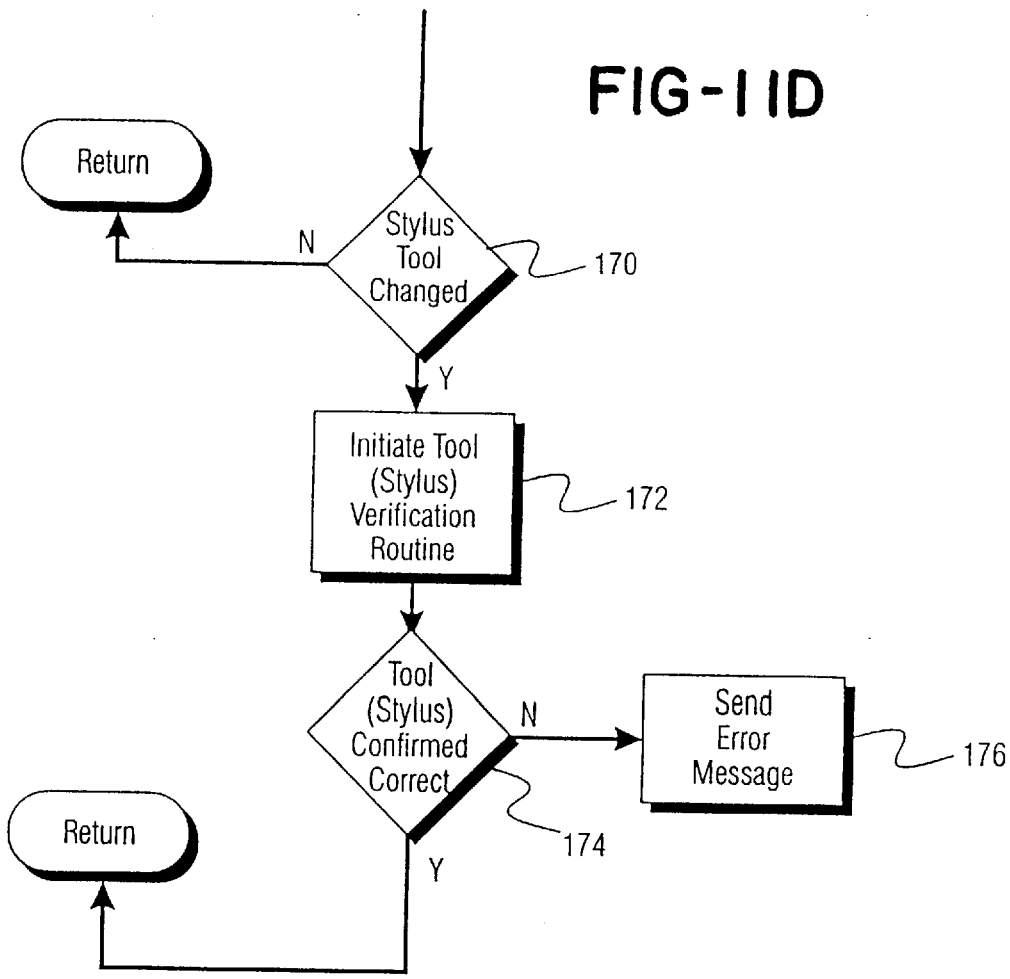

After block 184 in FIG. 15, the routine ends and returns to decision block 174 (FIG. 11D). At this point, controller 46 determines if the actual measured stylus angle $\propto$ corresponds or is within a predetermined threshold or tolerance range, such as ±1 percent, to the desired or predicted angle of the stylus angle for the stylus which is mounted on engraving head 36. If it does, then the routine loops back to decision block 106 as shown. If it does not, an error message is generated to indicate to the operator that the stylus mounted on engraving head 36 comprises a stylus angle which varies unacceptably from the stylus angle desired. At this point, the routine ends.

Advantageously, this system and method provides means for verifying that the stylus mounted in the engraving head 36 is correct and its angle is proper.

Advantageously, this method and apparatus provide a system for automatic change over of tools on an engraving head when desired, such as when the useful life of the tool on the engraving head 36 is expired or a determination that the tool is broken or otherwise needs to be replaced. Although the embodiment has been shown and described relative to an engraving shoe, burr cutter, and stylus provided in a cartridge or non-cartridge form, it should be appreciated that other forms of the invention which achieve the automatic change over may be utilized.

The use of cartridge-mounted tools enables an operator to easily position and align a replacement cartridge tool (not shown) on turret 58. The use of cartridge-mounted tools further facilitates transfer or exchange of the cartridge-mounted tool from tool changer 50 to engraving head 36.

For example, one of the tool holders 64a–64f could be configured to comprise a stylus changer 200 of the type shown in FIGS. 8a, 8b–10 which permits changing of a stylus 216 which is not mounted on or integral with a stylus arm. In this arrangement, the changer 200 has an end 200a mounted directly onto turret 58, as shown in FIG. 8b. Notice that an end 200b of stylus changer 200 comprises a receiving area 202 (FIG. 8a) having a plurality of resilient bearings 204, 206 and 208 associated therewith. These bearings 204, 206 and 208 are conventionally spring biased towards opening 202 by a plurality of springs 210 (FIG. 10), 212 and 214, respectively, in order to secure a stylus, such as stylus 216, in end 200b.

In operation, the engraving head 36 is moved relative to tool changer 50 as described above, such that end 200b becomes aligned with stylus arm 218 (FIGS. 8a, 8b and 9). Initially, engraving head 36 is moved towards end 200b of stylus changer 200 until the stylus 216 is captured in opening 202 and secured therein by the spring loaded detents 204, 206 and 208. Thereafter, engraving head 36 is moved away from turret 58 in order to pull the stylus 216 away from the stylus holder or arm 218, as best illustrated in FIGS. 8a, 8b and 9.

Thereafter, the turret 58 is subsequently rotated, and a replacement stylus 216 situated on a stylus changer 200 which is loaded with a replacement stylus in tool changer 50 is forced into stylus arm 218.

As with the method and routine described above, if the tool changer 50 is not properly situated relative to engraving head 36, the stylus changer 200 is not properly aligned with the stylus arm 218, or the aperture 202 of the stylus changer 200 is not properly aligned with that stylus 216, then an appropriate alarm is generated by controller 46 and the operator is notified.

FIGS. 12–14 illustrate means for utilizing multiple sets of tools to minimize or reduce the need for changing tools. Referring now to FIGS. 12–13, an engraving head turret 300 comprises a plurality of heads 36a'–36d' situated on a turret 302. The turret 302, in turn, is situated in a channel 304 for movement in the direction of double arrow G (FIG. 14) such that the turret 300 moves toward and away from surface 16a of cylinder 16. The support 306 may be mounted directly onto platform surface 38a (FIG. 3) or alternatively onto support 40 which is driven by leadscrew 41.

Notice in FIG. 14, that the engraving head turret system 300 further comprises drive means comprising a drive motor 308 which is capable of rotatably driving the turret 300 in response to controller 46 such that a desired engraving head 36a'–36d' is positioned in operative relationship with surface 16a of cylinder 16. Controller 46 may then energize motor 44 (FIG. 3) to cause support 306 to be moved towards surface 16a so that the selected engraving head 36a'–36d' may engrave surface 16a' as desired.

The engraving head turret system 300 further comprises a drive motor 310 which is coupled to controller 46 and is capable of driving turret 300 towards and away from surface 16a. In this regard, turret 300 may comprise a shaft 312 coupled to a support 314 (FIG. 13) situated in a channel 304 defined by a generally U-shaped support 306. A plurality of bearings (not shown) may be situated between support 314 and U-shaped support 306 to facilitate movement of the support 314 and turret 302 in the channel 304.

It should be appreciated that the engraving heads 36a'–36d' operate in the same or similar manner as engraving head 36 mentioned earlier herein. In operation, a particular engraving head 36a' is selected and controller 46 energized drive motor 308 to index turret table 302 until the selected engraving head 36a'–36d' is situated in operative relationship with surface 16a' of cylinder 16'. To facilitate indexing and positioning of the appropriate engraving head 36a'–36d', the generally U-shaped support 306 may comprise sensing means including a sensor 316 and a plurality of targets 318 associated with each engraving head 36a'–36d' which are coupled to controller 46. Further, the rotary drive motor 308 may comprise an encoder (not shown) which is also coupled to controller 46 and which cooperates with sensors 316 and targets 318 to generate position information for accurately identifying the position of each engraving head 36a'–36d' relative to surface 16a of cylinder 16.

Notice in FIG. 13, that the engraving head turret system 300 further comprises a solenoid 320 which is coupled to controller 46 and which cooperates with an aperture, such as aperture 36d-1' associated with engraving head 36d'. It should be appreciated that each engraving head 36a'–36d' has an associated aperture thereunder in turret platform 302 such that the turret 302 can be locked into place so that it does not move, for example, during engraving.

Advantageously, this system and method provides means for situating multiple engraving heads on an engraver and for selectively changing heads without the need for manual intervention. This has significant advantages when, for example, an engraving job requires the use of different styli or when a tool on one of the engraving heads is worn or broken. For example, each engraving head 36a'–36d' may be equipped with its own dedicated set of tools, such as a stylus having a predetermined or desired angle. When it desired or necessary to change from one stylus angle to a stylus having a different angle, controller 46 can selectively energizes drive motor 308 until the engraving head 36a'–36d' having the desired stylus angle is operatively positioned relative to surface 16a of cylinder 16. This facilitates reducing the need to change a stylus on any particular head 36a'–36d'.

It should also be appreciated that the engraving head turret system 300 may also be utilized in combination with the tool changer 50, if necessary, to change one or more of the tools situated on the engraving heads 36a'–36d+. For example, although not shown, it is envisioned that while one of the heads 36a'–36d' is engraving, the tool changer 50 could be situated so that it can simultaneously change one or more of the tools on the idle engraving heads. This facilitates providing the benefit of an interchangeable engraving head engraver with the advantages mentioned above relative to the automatic tool changer 50.

While the methods herein described, and the forms of apparatus for carrying these methods into effect, constitute preferred embodiments of this invention, it is to be understood that the invention is not limited to these precise methods and departing from the scope of the invention, which is defined in the appended claims.

What is claimed is:

1. An engraver comprising:

a controller for controlling the operation of the engraver;

an engraving head coupled to said controller for engraving an engraved pattern on a workpiece situated on said engraver, said engraving head having at least one tool mounted thereon; and an automatic tool changer situated on said engraver for automatically changing said at least one tool.

2. The engraver as recited in claim 1 wherein said automatic tool changer further comprises:

a replacement tool holder for holding a replacement tool in operative relationship with said engraving head when said automatic tool changer is in a tool changing relationship with the engraving head.

3. The engraver as recited in claim 2 wherein said automatic tool changer further comprises:

a driver responsive to said controller for causing relative movement between said replacement tool holder and said engraving head to automatically change said at least one tool.

4. The engraver as recited in claim 1 wherein said automatic tool changer further comprises:

a tool receiver for receiving said at least one tool when it is desired to change said at least one tool.

5. The engraver as recited in claim 1 wherein said automatic tool changer further comprises:

a tool receiver for receiving said at least one tool when it is desired to change said at least one tool.

6. The engraver as recited in claim 5 wherein said tool receiver comprises:

a tool holder for receiving said at least one tool.

7. The engraver as recited in claim 1 wherein said automatic tool changer comprises:

a turret coupled to said driver for supplying said replacement tool and also for receiving said at least one tool when it is to be changed.

8. The engraver as recited in claim 7 wherein said automatic tool changer further comprises:

a turret driver for rotatably indexing said turret.

9. The engraver as recited in claim 1 wherein said automatic tool changer further comprises:

a pressure source controlled by said controller for providing pressure to facilitate transferring said at least one tool.

10. The engraver as recited in claim 9 wherein said pressure source is air pressure which provides negative pressure to transfer said at least one tool to said automatic tool changer.

11. The engraver as recited in claim 9 wherein said pressure source is air pressure which provides positive pressure to transfer a replacement tool onto said engraving head.

12. The engraver as recited in claim 1 wherein said automatic tool changer further comprises:

a driver coupled to said controller for causing relative movement between said engraving head and said automatic tool changer.

13. The engraver as recited in claim 12 wherein said driver is capable of driving said engraving head towards said automatic tool changer.

14. The engraver as recited in claim 1 wherein said automatic tool changer further comprises:

a tool holder for receiving said at least one tool.

15. The engraver as recited in claim 14 wherein said at least one tool comprises a predetermined configuration;

said worn tool holder comprising a shape which complements the shape of said predetermined configuration.

16. The engraver as recited in claim 1 wherein said at least one tool is a cartridge tool.

17. The engraver as recited in claim 1 wherein said automatic tool changer further comprises a mounting tool responsive to said controller capable of unfastening or fastening said at least one tool to said engraving head.

18. The engraver as recited in claim 1 wherein said automatic tool changer further comprises:

a position sensor coupled to said controller for determining if said automatic tool changer is aligned with said engraving head.

19. The engraver as recited in claim 1 wherein said engraver further comprises:

an alarm coupled to said controller for generating an alarm if said automatic tool changer is not aligned with said engraving head.

20. The engraver as recited in claim 1 wherein said automatic tool changer further comprises:

a rotatable turret having a tool holder for receiving said at least one tool when it is to be changed and a replacement tool holder for supporting a replacement tool.

21. The engraver as recited in claim 1 wherein said automatic tool changer further comprises:

an air pressure source associated with said automatic tool changer for providing air pressure to facilitate changing said at least one tool.

22. The engraver as recited in claim 21 wherein said air pressure source provides negative pressure to transfer said at least one tool into a tool holder from said engraving head.

23. The engraver as recited in claim 21 wherein said air pressure source provides positive air pressure to transfer a replacement tool onto said engraving head.

24. The engraver as recited in claim 1 wherein said at least one tool is a burr cutter.

25. The engraver as recited in claim 1 wherein said at least one tool is a shoe.

* * * * *